US008599832B2

(12) United States Patent
Altberg et al.

(10) Patent No.: US 8,599,832 B2
(45) Date of Patent: Dec. 3, 2013

(54) METHODS AND APPARATUSES TO CONNECT PEOPLE FOR REAL TIME COMMUNICATIONS VIA VOICE OVER INTERNET PROTOCOL (VOIP)

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Anuj Agarwal, San Francisco, CA (US); Nitin Ahuja, Redwood City, CA (US); Mehul Jain, Sunnyvale, CA (US)

(73) Assignee: Ingenio LLC, San Francisco, CA (US)

( * ) Notice: Subject to any disclaimer, the term of this patent is extended or adjusted under 35 U.S.C. 154(b) by 1544 days.

(21) Appl. No.: 11/752,267

(22) Filed: May 22, 2007

(65) Prior Publication Data

US 2007/0242626 A1 Oct. 18, 2007

Related U.S. Application Data

(60) Provisional application No. 60/915,104, filed on Apr. 30, 2007.

(51) Int. Cl.
*H04L 12/66* (2006.01)
*G06F 15/16* (2006.01)
*G06Q 30/00* (2012.01)

(52) U.S. Cl.
USPC .......................... 370/352; 709/228; 705/14.4

(58) Field of Classification Search
USPC ........ 705/14.4–14.73; 370/352–356; 709/228
See application file for complete search history.

(56) References Cited

U.S. PATENT DOCUMENTS

| 4,788,718 | A | 11/1988 | McNabb et al. |
| 6,393,117 | B1 | 5/2002 | Trell |
| 6,570,870 | B1 | 5/2003 | Berstis |
| 6,690,672 | B1 * | 2/2004 | Klein ............................ 370/401 |

(Continued)

FOREIGN PATENT DOCUMENTS

| JP | 2002278858 | 9/2002 |
| JP | 2003337896 | 11/2003 |

(Continued)

OTHER PUBLICATIONS

International Application No. PCT/US2008/059687, Written Opinion and International Search Report, Aug. 25, 2008.

(Continued)

*Primary Examiner* — Asad Nawaz
*Assistant Examiner* — Joel Hamel
(74) *Attorney, Agent, or Firm* — Greenberg Traurig, LLP

(57) ABSTRACT

Methods and systems to facilitate real time communications via a telephonic apparatuses that support data communications. In one embodiment, a telephonic apparatus includes: a user interface to receive a search criterion; a network interface coupled to the user interface to submit a query from the telephonic apparatus over a data communication network and to receive at least one advertisement, the advertisement including a telephonic reference containing information about the query; and a call module coupled to the user interface and the network interface. In response to a user selection of the advertisement, the call module is to establish a connection with a connection server for a telephonic call using the telephonic reference, where the connection server is to extract from the telephonic reference the information about the query and to connect the telephonic call to an advertiser of the advertisement.

12 Claims, 31 Drawing Sheets

(56) References Cited

U.S. PATENT DOCUMENTS

| | | |
|---|---|---|
| 6,788,769 B1 | 9/2004 | Waites |
| 6,882,985 B1 | 4/2005 | Kay et al. |
| 6,937,699 B1 | 8/2005 | Schuster et al. |
| 7,027,802 B2 | 4/2006 | Kim |
| 7,099,306 B2 | 8/2006 | Goodman et al. |
| 7,177,415 B1 | 2/2007 | Kim |
| 7,340,048 B2 | 3/2008 | Stern et al. |
| 7,450,566 B2 | 11/2008 | Wong |
| 7,533,144 B2 | 5/2009 | Kassab |
| 7,548,915 B2 | 6/2009 | Ramer et al. |
| 7,734,502 B1 | 6/2010 | Yehoshua et al. |
| 8,027,878 B2 | 9/2011 | Wong et al. |
| 8,095,467 B2 | 1/2012 | Bettinger |
| 2001/0026609 A1 | 10/2001 | Weinstein et al. |
| 2001/0027481 A1 | 10/2001 | Whyel |
| 2002/0075844 A1 | 6/2002 | Hagen |
| 2002/0095367 A1 | 7/2002 | Mizunuma et al. |
| 2002/0124188 A1 | 9/2002 | Sherman et al. |
| 2002/0133446 A1 | 9/2002 | Lee |
| 2002/0167919 A1 | 11/2002 | Marples et al. |
| 2002/0191762 A1 | 12/2002 | Benson |
| 2004/0103024 A1 | 5/2004 | Patel et al. |
| 2004/0234043 A1 | 11/2004 | Argo |
| 2004/0234064 A1* | 11/2004 | Melideo ............... 379/265.09 |
| 2004/0243939 A1* | 12/2004 | Perepa et al. ............ 715/739 |
| 2004/0249951 A1 | 12/2004 | Grabelsky et al. |
| 2005/0018849 A1* | 1/2005 | Rodriguez et al. ........... 380/257 |
| 2005/0044238 A1 | 2/2005 | Jacob et al. |
| 2005/0049971 A1 | 3/2005 | Bettinger |
| 2005/0245274 A1* | 11/2005 | Oishi et al. ............ 455/456.5 |
| 2005/0256766 A1* | 11/2005 | Garcia et al. ............. 705/14 |
| 2005/0289097 A1 | 12/2005 | Trossen et al. |
| 2006/0004789 A1* | 1/2006 | Lunt et al. ................. 707/100 |
| 2006/0074760 A1 | 4/2006 | Helin |
| 2006/0078096 A1 | 4/2006 | Poyhonen et al. |
| 2006/0165068 A1 | 7/2006 | Dalton et al. |
| 2006/0245576 A1* | 11/2006 | Henry .................... 379/265.01 |
| 2007/0005585 A1 | 1/2007 | Feng |
| 2007/0112656 A1 | 5/2007 | Howe et al. |
| 2007/0130338 A1 | 6/2007 | Malik et al. |
| 2007/0160076 A1 | 7/2007 | Faber et al. |
| 2007/0177578 A1 | 8/2007 | Anspach et al. |
| 2007/0202881 A1 | 8/2007 | Dervan |
| 2007/0206506 A1 | 9/2007 | Purpura |
| 2008/0005268 A1 | 1/2008 | Chen |
| 2008/0008306 A1 | 1/2008 | Kliger |
| 2008/0071554 A1 | 3/2008 | Miles et al. |
| 2008/0107102 A1 | 5/2008 | Kaufman et al. |
| 2008/0144604 A1 | 6/2008 | Sharma et al. |
| 2009/0113312 A1 | 4/2009 | Schoenberg |
| 2009/0138317 A1 | 5/2009 | Schoenberg |
| 2009/0323670 A1 | 12/2009 | Altberg et al. |
| 2010/0191657 A1 | 7/2010 | Melideo |

FOREIGN PATENT DOCUMENTS

| | | | |
|---|---|---|---|
| JP | 2005141583 A | | 6/2005 |
| KR | 20010086595 | | 9/2001 |
| KR | 200343827 A | | 6/2003 |
| WO | WO 03/102738 | * | 12/2003 |

OTHER PUBLICATIONS

International Application No. PCT/US06/37712, Written Opinion and International Search Report, Aug. 8, 2007.

International Application No. PCT/US07/82445, Written Opinion and International Search Report, May 23, 2008.

* cited by examiner

161

Create Ad [?] Help

Your ad is very important. Tell customers exactly what you're selling and why they should call you. Please review our Pay Per Call Ad Guidelines to ensure your ad is accepted and gets new customers calling your business today.

Ad Location Info

Business Name: [_____] (Sorry, no phone numbers)

☐ Use my Account Information

Address 1: [_____]

Address 2: [_____] (Optional)

City: [_____]

State: [-Select State- ▽]

Zip Code: [____]-[____]

Phone Number: ([____])[____]-[____]  Enter the number where you'd like to receive calls Fax: ([____])[____]-[____]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
  - Call today and get $5 off.
  - Free consultation – limited time.
  - Call now and save 10%.
You'll be able to include more information about your offer on the business profile page. Learn more Marketing Message Line 1: [_____] (35 characters)

Marketing Message Line 2: [_____] (35 characters)

METHODS AND APPARATUSES TO CONNECT PEOPLE FOR REAL TIME COMMUNICATIONS VIA VOICE OVER INTERNET PROTOCOL (VOIP)

CROSS-REFERENCE TO RELATED APPLICATIONS

The present application claims priority to Provisional U.S. Patent Application Ser. No. 60/915,104, filed Apr. 30, 2007, the disclosure of which is incorporated herein by reference.

The present patent application is related to: U.S. patent application Ser. No. 11/274,453, filed Nov. 14, 2005 and entitled "Methods and Apparatuses to Access Advertisements through Voice over Internet Protocol (VoIP) Applications" and claimed to the priority of Provisional U.S. Patent Application Ser. No. 60/721,793 filed Sep. 28, 2005, and U.S. patent application Ser. No. 11/563,464, filed Nov. 27, 2006 and entitled "Methods and Apparatuses to Provide Application Programming Interface for Retrieving Pay Per Call Advertisements" and claimed to the priority of Provisional U.S. Patent Application Ser. No. 60/862,719 filed Oct. 24, 2006. The disclosures of the related applications are incorporated herein by reference.

TECHNOLOGY FIELD

At least some embodiments of the disclosure relate to communication connections in general and more particularly but not limited to connecting people for real time communications via Voice over Internet Protocol (VoIP).

BACKGROUND

People can use telephone systems to conduct real time two-way voice communications without having to be at the same physical location. Traditional land-line based telephone systems connect one telephone set to another through one or more switching centers, operated by one or more telephone companies, over a land-line based telephone network which was typically a circuit switched network.

Current telephone systems may also use a packet switched network for a telephonic connection. A packet switched network is typical in a computer data environment. Recent developments in the field of Voice over Internet Protocol (VoIP) allow the delivery of voice information using the Internet Protocol (IP), in which voice information is packaged in a digital form of discrete packets rather than in the traditional circuit-committed protocols of the public switched telephone network (PSTN).

Cellular communication networks allow a cellular phone to connect to a nearby cellular base station through an air interface for wireless access to a telephone network. Recent developments in wireless telephone systems allow not only voice communications but also data communications. For example, cellular phones can now receive and send messages through a Short Message Service (SMS), a Multimedia Message Service (MMS), or data communication connections. For example, web pages can be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone systems are frequently used in conducting business. Telephone numbers are typically provided in advertisements, web sites, directories, etc., as a type of contact information to reach businesses, experts, persons, etc.

The Internet provides another communication media that can also be used as an advertisement media to reach globally populated web users. For example, advertisements can be included in a web page that is frequently visited by web users. Typically, advertisements included in web pages contain only a limited amount of information (e.g., a small paragraph, an icon, etc.); and links in the advertisements are used to direct the visitors to the web sites of the advertisers for further detailed information. For certain arrangements, the advertisers pay for the advertisements based on the number of visits directed to their web sites by the links in the advertisements, or based on the number of presentations of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

SUMMARY OF THE DESCRIPTION

Methods and systems to facilitate real time communications via a telephonic apparatuses that support data communications are described here. Some embodiments are summarized in this section.

In one embodiment, a telephonic apparatus that supports data communication is used to query for advertisements via a web service of a connection provider. The advertisements contain telephonic references, which can be used by the telephonic apparatus to call the connection provider. The connection provider identifies the telephone contact information of the corresponding advertisers based on the telephonic references called by the telephonic apparatus and further connects the call to the advertisers. In one embodiment, the telephonic references are Session Initiation Protocol (SIP) Uniform Resource Identifiers (URI) which contains the encrypted information, including the telephone number of the advertiser, an identifier of the telephonic apparatus, information about the query, and/or the position of the advertisement in the list of the search result, etc. In one embodiment, the connection provider charges the caller on behalf of the advertiser for services provided by the advertiser over the telephonic connection established via the advertisement. In one embodiment, the connection provider charges the advertiser an advertisement fee per connection made via the advertisement.

In one embodiment, a telephonic apparatus includes: a user interface to receive a search criterion; a network interface coupled to the user interface to submit a query from the telephonic apparatus over a data communication network and to receive at least one advertisement, the advertisement including a telephonic reference containing information about the query; and a call module coupled to the user interface and the network interface. In response to a user selection of the advertisement, the call module is to establish a connection with a connection server for a telephonic call using the telephonic reference, where the connection server is to extract from the telephonic reference the information about the query and to connect the telephonic call to an advertiser of the advertisement.

In one embodiment, a method includes: responsive to a search criterion received in a telephonic apparatus, submitting a query from the telephonic apparatus over a data communication network; receiving at the telephonic apparatus at least one advertisement from, the advertisement including a telephonic reference containing information about the query; and responsive to a user selection of the advertisement at the telephonic apparatus, establishing a connection with a connection server for a telephonic call using the telephonic reference, the connection server to extract from the telephonic reference the information about the query and to connect the telephonic call to an advertiser of the advertisement.

In one embodiment, a method includes: receiving a query over a data communication network; identifying at least one advertisement according to the query; generating a telephonic reference of a connection server, the telephonic reference containing information including a search criterion of the query and a telephonic reference of an advertiser of the advertisement; and providing the advertisement with the telephonic reference for presentation on a telephonic apparatus. When the telephonic apparatus calls the connection server using the generated telephonic reference of the connection server, the connection server extracts from the telephonic reference called by the telephonic apparatus the telephonic reference of the advertiser, to provide a connection between the telephonic apparatus and the advertiser using the telephonic reference of the advertiser, and to associate the connection with the search criterion.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 5 illustrates a user interface for the creation of an advertisement according to one embodiment.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In embodiments, a listing may or may not be provided on behalf of an advertiser. For example, a community of users may create listings of businesses, sellers, etc. based on the recommendation of the users. For example, a directory service provider may compile listings of some businesses or sellers without the businesses or sellers explicitly request the directory service provider to advertise for them. A business or seller presented by a listing may or may not pay an advertisement fee for the presentation of the listing and/or for the lead to the customers resulting from the presentation of the listing. In one embodiment, an advertiser of an advertisement is charged an advertisement fee based on the performance of the advertisement (e.g., a telephonic connection to a customer, a lead for real time communication with a customer, a deal completed with the customer as a result of the performance, a subscription fee for a number of bundled leads or deals, etc.).

Figure 1A:
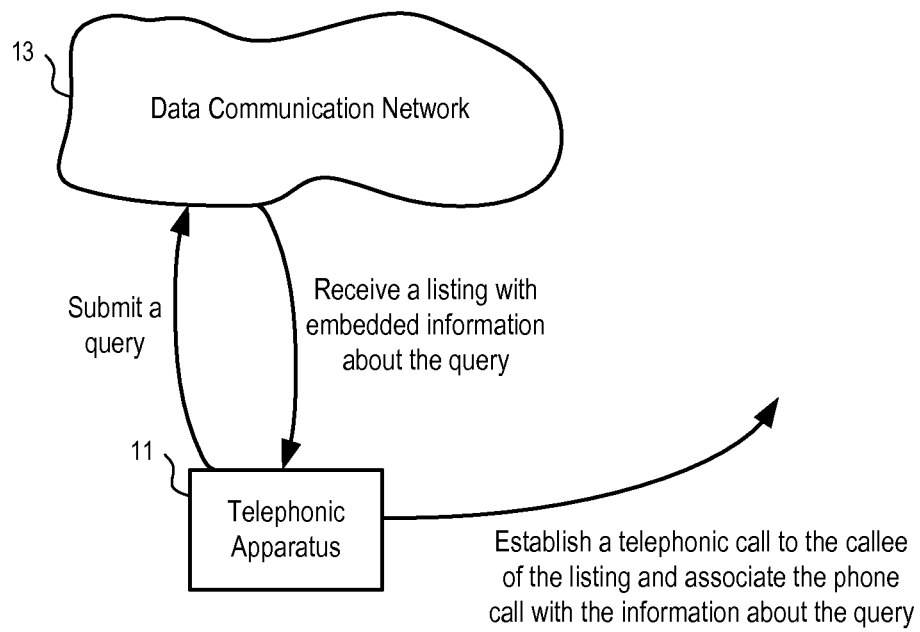
FIG. 1A illustrates a system to associate query information used to search for a listing with a telephonic connection resulted from a presentation of the listing on a telephonic apparatus according to one embodiment.

FIG. 1A illustrates a system to associate query information used to search for a listing with a telephonic connection resulted from a presentation of the listing on a telephonic apparatus according to one embodiment. In FIG. 1A, the telephonic apparatus (11) has the data communication capability. After a query is submitted from the telephonic apparatus (11) over a data communication network (13), a listing is received with embedded information about the query. The information about the query may be received in clear text, in an encoded format, or in encrypted text. The listing may be an advertisement received from a server, a community listing received from a peer to peer network, a directory listing (e.g., a telephone book listing, a directory assistance listing, etc.).

Alternatively or in combination, the listing can include other information received with the query from the telephonic apparatus, such as the identity of the telephonic apparatus or the identity of the user of the telephonic apparatus, the identity of an operator of the telephonic apparatus, a reference link that causes the telephonic apparatus to submit the query, etc.

Alternatively or in combination, the listing can include information generated or identified after the query is received from the telephonic apparatus. For example, the listing may include discount or electronic coupon information, the identity of parties who contributed to the delivering of the listing to the telephonic apparatus, the bid price of an advertiser for the advertisement, date and time of a search performed to locate the listing, etc.

The listing received at the telephonic apparatus may or may not include a telephonic reference of the callee of the listing.

In one embodiment, a telephonic reference is used to identify an "end point" on a telephonic network for a telephonic connection to the "end point". The telephonic network may be a circuit switched network, or a packet switched network, or a combination of one or more circuit switched networks and one or more packet switched networks. For example, the telephonic reference may be a telephone number with an extension, a telephone number without an extension, a session initiation protocol (SIP) uniform resource identifier (URI), a user identifier of an instant messaging network, a user identifier of a Voice over Internet Protocol (VoIP) network, or a user identifier of a peer to peer VoIP network, etc.

Once the information about the query and/or other parameters are received with the listing at the telephonic apparatus, the telephonic apparatus can establish a telephonic call to the callee of the listing in response to a user request; and the telephonic apparatus can cause the telephonic call to be associated with the information about the query and/or other parameters to be tracked. Telephonic apparatus may or may not initiate the call; and the telephonic apparatus may transmit the information about the query in various ways in the process of establishing the call, or report the association between the information about the query and the telephonic call without transmitting the information about the query via messages for call signaling. Various detailed embodiments are discussed bellow.

In one embodiment, the query information related to a search for a listing (e.g., search terms of a user, and/or the parameters characterizing the circumstances that lead the user to the listing, such as the hierarchy of directories browsed by the user to reach the listing, a predefined query, a link to the listing, etc.) is provided with the listing to a user. After the listing is presented to the user, the user may want to talk to the entity presented by the listing. During the process of a telephonic connection between the user and the entity (e.g., during the initiation, termination, reconnection, etc.), the query information, which was provided with the listing to the user terminal/telephonic apparatus, is received from the user terminal/telephonic apparatus to correlate the query information with the telephonic connection. Alternatively, the query information is correlated with the telephonic connection by the telephonic apparatus; and information identifying the correlation between the query information and the telephonic connection can be submitted from the telephonic apparatus (e.g., to the listing provider or other parties who are interested in the information) during or after the telephonic connection.

In one embodiment, the query information is provided from the user in an automated way via the telephonic apparatus to avoid burdening the user. In one embodiment, the telephonic apparatus is configured to receive the query information together with the listing and transmit the query information to a connection provider during the process of initiating a telephonic connection between the user and the entity.

Figure 1B:
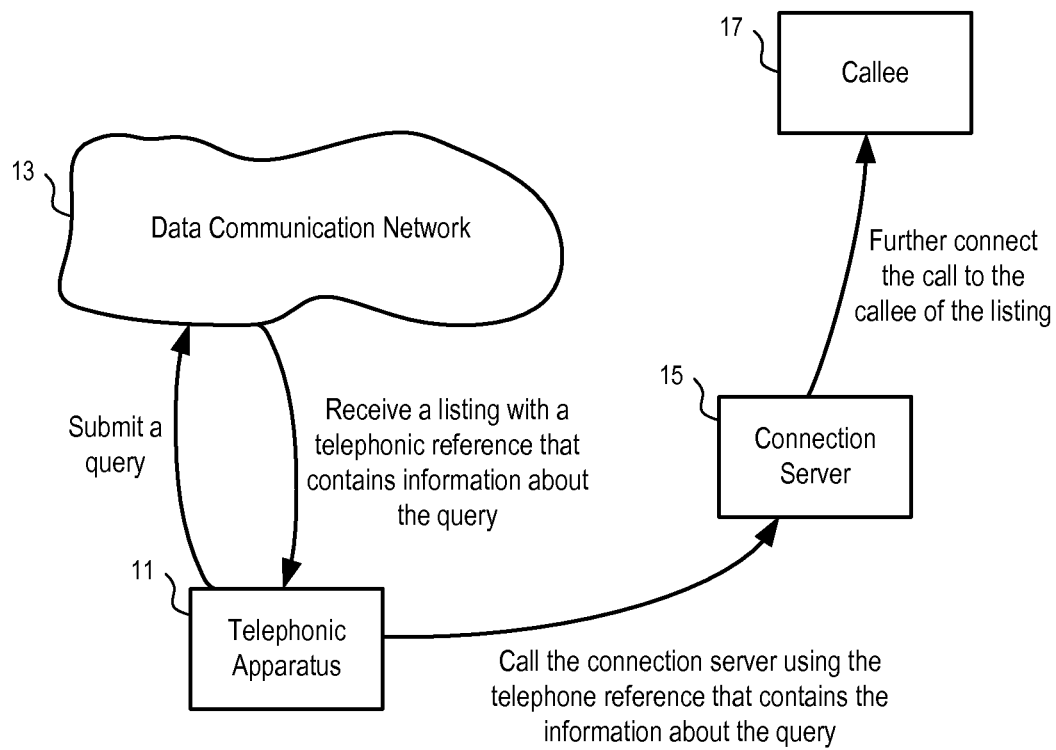
FIG. 1B illustrates a system to track query information via a telephonic reference of a connection server that contains the query information according to one embodiment.

FIG. 1B illustrates a system to track query information via a telephonic reference of a connection server that contains the query information according to one embodiment. In FIG. 1B, a telephonic apparatus (11) is configured to have the capability to query for advertisements/listings over the data communication network (13) and then initiate calls to a connection provider (15) using telephonic references provided with the advertisements/listing; and the connection provider is configured to connect the calls to the respective callee (17) (e.g., advertisers) based on the telephonic references that are used by the telephonic apparatus to call the connection provider.

In one embodiment, a communication method is designed to track various parameters about the process from the query for advertisements/listings to the initiation of the calls to allow improved visibility of the process at the time the calls are received from the connection provider point of view. In one embodiment, the communication method includes using a Session Initiation Protocol (SIP) Uniform Resource Identifiers (URI) that contains the encrypted information about the parameters to facilitate the tracking of the parameters.

Alternatively, the parameters to be tracked can be provided as an encoded or concatenated string of part of the SIP URI. When the SIP URI is used to initiate the call to the connection provider, the parameters can be extracted or decoded from the SIP URI of the received call.

Alternatively or in combination, some or all the parameters can be transmitted, in clear text, encoded text or encrypted text, in the header and/or body of one or more call signaling messages, such as INVITE, ACK, and/or OPTIONS messages according to a Session Initiation Protocol (SIP) or call signaling messages according other protocols. Other messages can also be used to identify the relation between the telephonic call and the parameters.

Figure 1C:
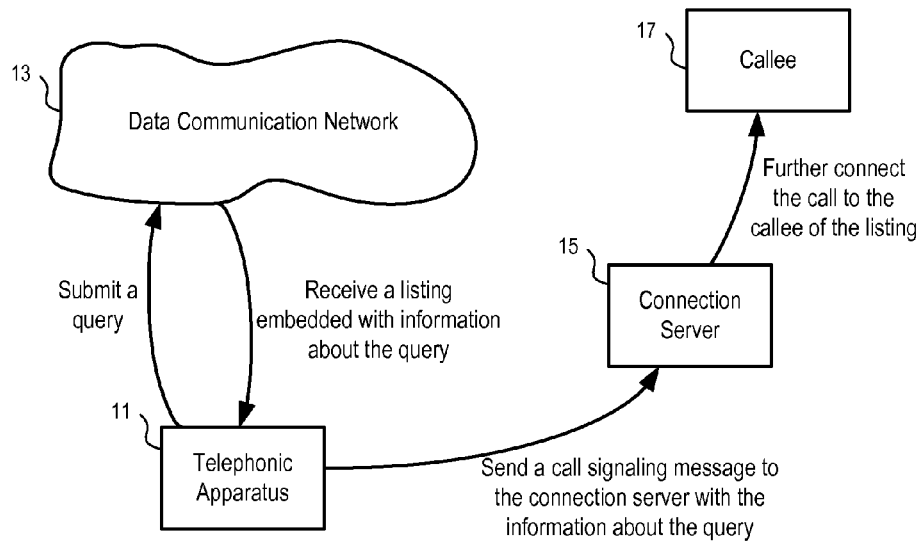
FIG. 1C illustrates a system to track query information via a call signaling message to a connection server that contains the query information according to one embodiment.

Alternatively, the parameters to be tracked can be provided separately from the SIP URI of the connection, as illustrated in FIG. 1C. FIG. 1C illustrates a system to track query information via a call signaling message to a connection server that contains the query information according to one embodiment. For example, in FIG. 1C, the information about the query can be transmitted from the telephonic apparatus (11) to the connection server (15) in a field of the call signaling message (e.g., SIP INVITE, ACK, or OPTIONS) other than the address information (e.g., request URI) of the message. For example, the information about the query can be provided in the header or body of the call signaling message (e.g., a call initiation message, a call termination message, etc.). In FIG. 1C, the information about the callee can be embedded in the address information of the call signaling message; and the connection server (15) can identify the telephonic reference of the callee based on the address information of the call signaling message, through decoding or decrypting the address information to obtain the telephonic reference of the callee or through looking up the telephonic reference of the callee from a database using the address information of the call signaling message. Alternatively, when the telephonic reference of the callee is provided in the header or body of the call signaling message (e.g., in clear text, in an encoded format, or in encrypted text), the connection server (15) can use the telephonic reference of the callee to further connection the call to the callee (17).

For example, the telephonic apparatus can be configured to call the connection server at a pre-configured telephonic reference or send call signaling messages to a pre-configured telephonic reference, with parameters embedded in the header or body of a call signaling message to identify the callee and/or the telephonic reference of the callee and to identify the parameters related to the telephonic call. Alternatively, a fixed telephonic reference of the connection server can be specified in the listing. Alternatively, different telephonic references of the connection server can be provided for different listings to identify different aspects of the listings.

In FIG. 1C, for example, the advertisement/listing and the parameters can be provided to the telephonic apparatus in an XML message, in which the parameters can be in clear text, in an encoded format, or as encrypted information; and the telephonic apparatus can submit the parameters with the call to the connection provider using a SIP INVITE message (e.g., in clear text, in the encoded format, or as the encrypted information) to initiate the call to the connection server.

In other examples, the parameters can be embedded in a request URI, one or more headers and/or the body of a SIP message (e.g., INVITE, ACK, OPTIONS). The SIP message may be sent directly from the telephonic apparatus, or via a gateway which constructs the SIP message after obtaining the parameters from the telephonic apparatus.

For example, the gateway can construct the SIP URI to include the parameters after receiving the telephonic reference and the parameters from the telephonic apparatus. For example, the gateway can construct the SIP INVITE message to include the parameters in the message body without modifying the SIP URI.

Alternatively, the telephonic apparatus may directly construct the SIP INVITE message from the telephonic reference and the parameters to be tracked. The telephonic apparatus may use the constructed SIP INVITE message to make a call to the connection server directly, or via a gateway.

In other embodiments, communication protocols other than SIP can be used to call the connection provider. For example, the connection provider can be called via a traditional telephone; and the parameters can be provided as an encoded or encrypted extension. For example, a proprietary communication protocol may be used to initiate the call; and the communication protocol may be bridged to the connection server and/or the callee in a different protocol via a gateway. For example, an HTTP message may be used to initiate the call.

In one embodiment, the parameters to be tracked are partially or completed contained in the addressing information (e.g., request URI) that is used to make the call. In one embodiment, the parameters to be tracked are partially or completed contained in the body of the message that is used to initiate the call.

Figure 1D:
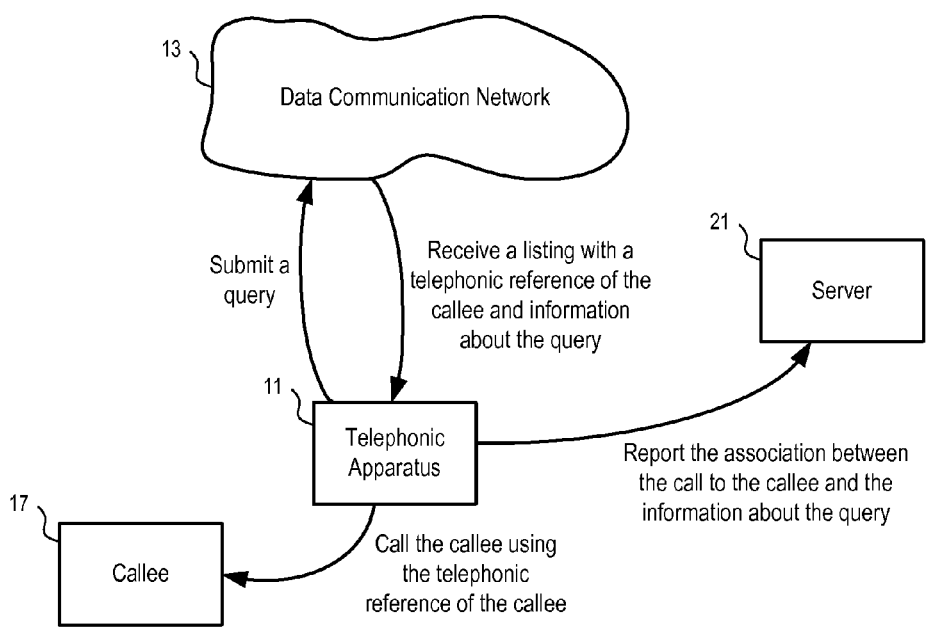
FIG. 1D illustrates a system to track query information via a report message from the telephonic apparatus that associates the call with the query information according to one embodiment.

In one embodiment, no centralized connection server is used to track the connection via being on the calling path from the telephonic apparatus and the callee, as illustrated in FIG. 1D. FIG. 1D illustrates a system to track query information via a report message from the telephonic apparatus that associates the call with the query information according to one embodiment. In FIG. 1D, the listing the telephonic apparatus (11) received from the data communication network (13) includes the information about the query and the telephonic reference of the callee. The telephonic apparatus (11) associates the call to the callee (17) with the information about the query (and/or other parameters received with the listing) and reports the association information to the server (21). The server can use the reported information to charge the advertisers, to compensate various partners who contributed to the delivery of the telephonic lead to the callee, and/or to improve future searches, etc.

In FIG. 1D, the telephonic reference provided in the listing/apparatus can be a reference for connecting to the callee (e.g., via a peer to peer network, or via a connection server, or via a telecommunication carrier); and the telephonic apparatus can be configured to correlate the parameters to be tracked with the telephonic connect made via the telephonic apparatus. The telephonic apparatus can be configured to report the correlation to a listing provider during or after the telephonic connect.

In one embodiment, a centralized server, or a peer to peer network, is used to resolve a telephonic reference into a format that is usable to call the callee, as illustrated in FIG.

Figure 1E:
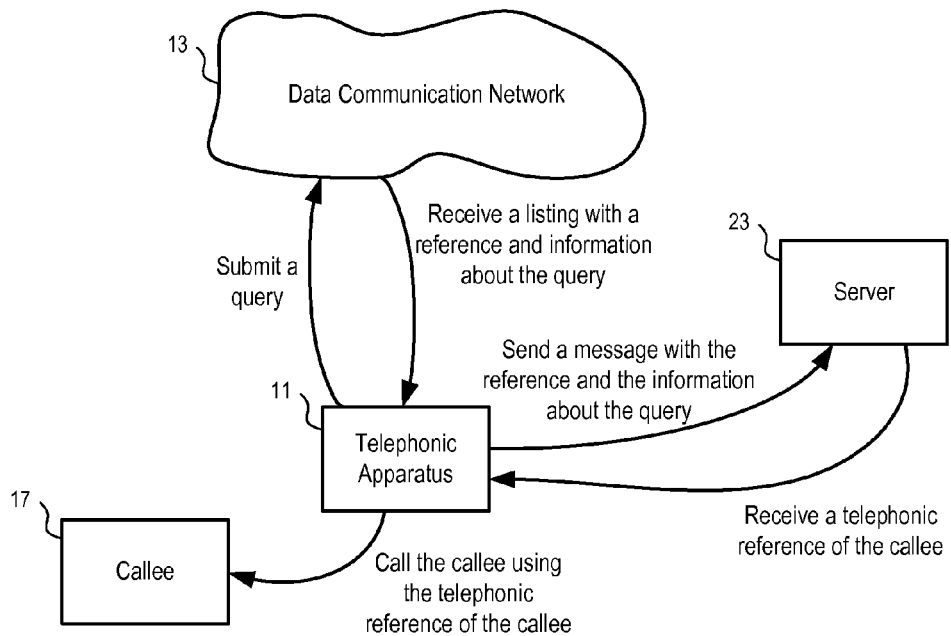
FIG. 1E illustrates a system to track query information via a request message to resolve a telephonic reference of the callee according to one embodiment.

1E. FIG. 1E illustrates a system to track query information via a request message to resolve a telephonic reference of the callee according to one embodiment. In FIG. 1E, the listing received by the telephonic apparatus (11) from the data communication network (13) includes the information about the query and a reference which cannot be used directly by the telephonic apparatus to call the callee. The telephonic apparatus is configured to request the server to resolve the telephonic reference of the callee based on the reference received in the listing. The request message sent from the message includes the information about the query and the reference. For example, the received reference can be an encrypted or encoded telephonic reference which is to be decrypted or decoded by the server (23). For example, the received reference may be an index for looking up the telephonic reference from a database by the server (23). Since the telephonic apparatus is configured to send the request message in response to a user request to call the callee (17), the request message is a reliable indicator that a telephonic call to the callee (17) will occur; and the server (23) can associate the call with the information about the query.

For example, a callee identifier can be provided as the telephonic reference (or part of the telephonic reference) received in the listing; and the telephonic apparatus is configured to obtain a telephone number of the callee, or an identifier of the callee in a VoIP network, to initiate the call to the callee. For example, the telephonic apparatus can be configured to query the centralized server, or the peer to peer network, to find out the identifier of the callee in the VoIP network (or an Internet address of the callee for a peer to peer connection) using the callee identifier (or the telephonic reference provided as in the listing). Through the process of resolving the telephonic reference that is provided in the listing, the parameters to tracked and the connection to be established can be correlated.

In one embodiment, the telephonic apparatus and the centralized server exchange one or more rounds of messages to resolve the telephonic reference and/or to establish the correlation between the telephonic connection and the parameters to be tracked. The telephonic apparatus can provide the parameters in the message, or as part of the address that is used to send the message.

Figure 1F:
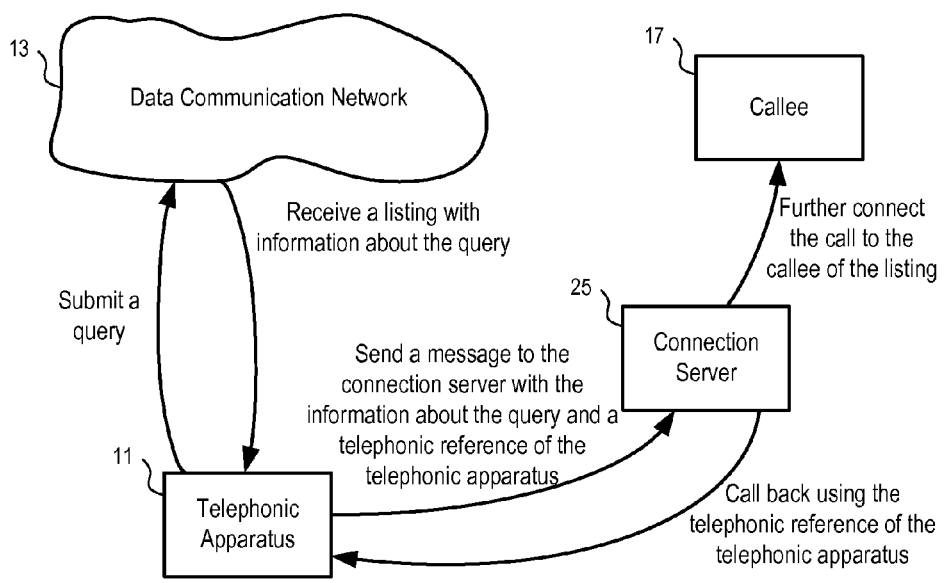
FIG. 1F illustrates a system to track query information via a callback message that contains the query information according to one embodiment.

In one embodiment, the telephonic apparatus sends a message to a connection server to request a call back from the connection server to connect the telephonic apparatus to the callee, as illustrated in FIG. 1F. FIG. 1F illustrates a system to track query information via a callback message that contains the query information according to one embodiment.

In FIG. 1F, the telephonic apparatus (11) sends a message (e.g., an HTTP message, an instant message, an email message, an SMS message, a SIP message, or a message according to a custom protocol, etc.) to the connection server (25) to request a callback. The parameters to be tracked can be provided in various fields of the message, such as the header, the subject line, the message body, etc. In one embodiments, the parameters can also be provided in the address information of the messages. The request also identifies the telephonic reference of the telephonic apparatus. Thus, after the connection server receives the call, the connection server can call back the telephonic apparatus, call the callee and bridge the calls to connect the telephonic apparatus to the callee.

In one embodiment, the telephonic reference of the callee is received with the listing at the telephonic apparatus (in clear text, in an encoded format, or in encrypted text). The connection server (25) can used the telephonic reference to call the callee (17) (e.g., after extracting/decoding/decrypting the telephonic reference of the callee from the message received from telephonic apparatus). In another embodiment, the telephonic reference of the callee is looked up from a database based on a reference to the callee provided in the listing.

In one embodiment, the communication method is designed to capture various information about the query, such as information about the customer who made the query, the time when the query was made, the query terms and/or the geographic locations for the query, the demand partner who helped in reaching the customer to generate the query, the domain/category on which the advertisement/listing is to be served, an identification of the advertisement/listing that is being returned as the result of the query, a supply partner who helped in introducing the advertiser into the network, the ordering position of the advertisement/listing in the sorted result set returned as a response to the query request, the keyword/category of the advertisement/listing that matches the query terms, the bid price of the advertiser for an advertisement fee at the time of the query, etc. The methods illustrated in FIGS. 1A-1F can be used to track various parameters other than the information about the query or in addition to the information about the query. Further, different parameters can be tracked using combinations of the methods illustrated in FIGS. 1A-1F. Furthermore, parameters can be tracked for different entities using combinations of the methods illustrated in FIGS. 1A-1F.

In one embodiment, such information to be tracked for the call is provided with the advertisement as the response (e.g., in a XML format) to the query and received at the connection provider at the time the telephonic apparatus calls the connection provider to identify the details about the query that leads to the call. In one embodiment, such information is contained or encrypted in the telephonic references provided in the advertisements to allow the connection provider to extract or decrypt the information at the time the connection provider receives the calls made via the telephonic references.

In one embodiment, the telephonic references are SIP URIs. Alternatively, the telephonic references can be other VoIP user identifiers, or telephone numbers with or without extensions. For example, the telephonic references can be user IDs of a peer to peer VoIP network, user IDs of an instant messaging network, etc. Other references that can be used on a telephonic apparatus to initiate a telephonic call can also be used as the telephonic references, such as click-to-assign references, click-to-callback references, click-to-resolve references, click-to-dial references, etc. Further details are provided below.

In another embodiment, such information to be tracked for the call is transmitted by the telephonic apparatus over a data communication channel to request a call back to the telephonic apparatus. In a further embodiment, such information is transmitted by the telephonic apparatus over a data communication channel while the telephonic apparatus is calling or is connected to the connection provider (or after the call). For example, a connection reference that is assigned to identify the connection can be used to identify the association between the information to be tracked and the telephonic connection. The telephonic apparatus may report the association during the initiation of the call, during the call, or after the call.

Alternatively or in combination, at least part of the information can be stored in a database; and the index pointing to the stored information can be transmitted to the telephonic apparatus with the advertisement. For example, the index can be an encrypted/encoded part of the telephonic reference, which can be used to locate the information in the database at the time the connection provider is called using the telephonic reference.

In one embodiment, the information to be tracked is transmitted in the messages for setting up the call; and one or more entities on the message transmission path of setting up the call can access the information during the set up phase of the call. In one embodiment, the information transmitted in the message during the set up phase of the call is encrypted to prevent unauthorized access to the information. Alternatively or in combination, the telephonic reference and/or the gateway and/or the connection server can be configured to report the association between the tracked information and the telephonic connection to one or more entities during or after the call.

Figure 1G:
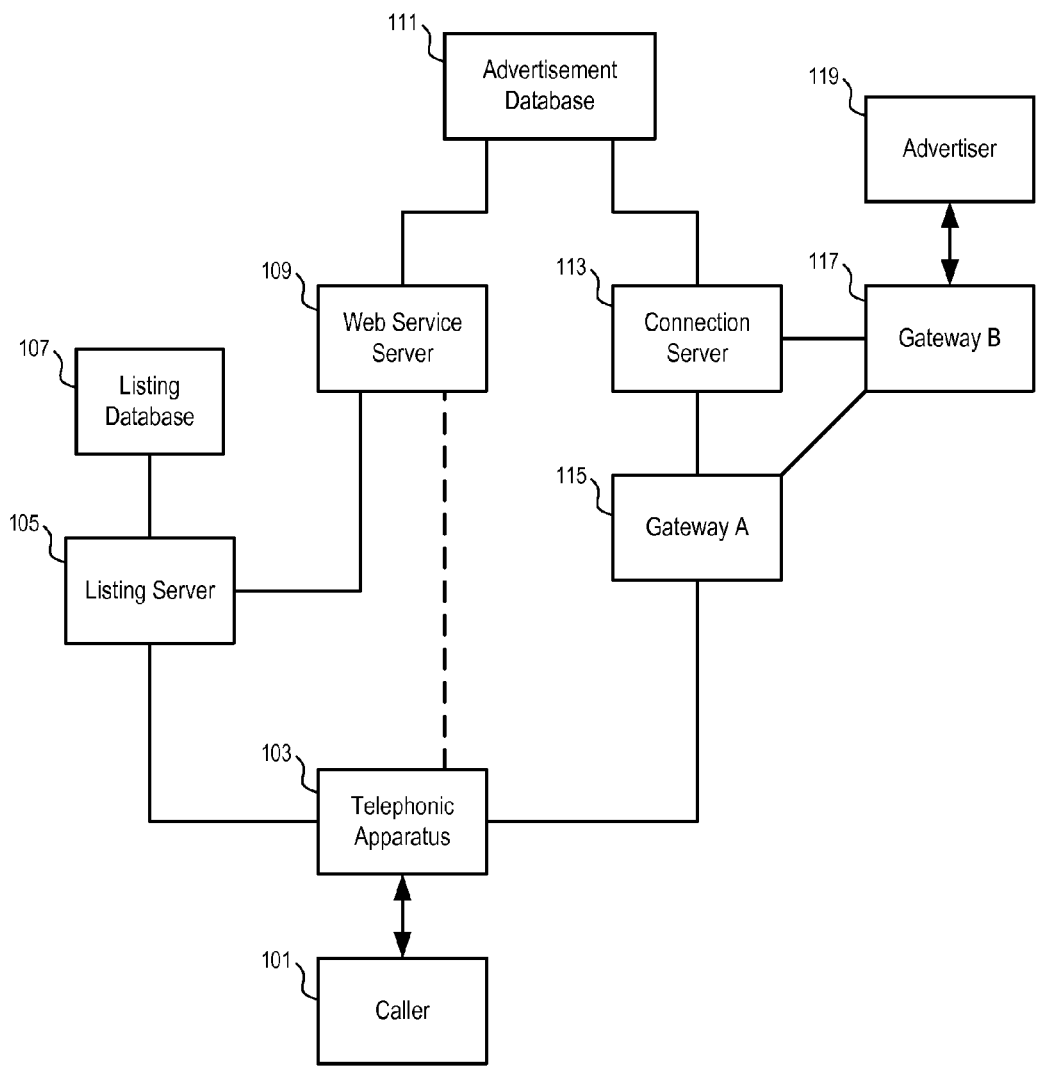
FIG. 1G illustrates a system to connect a caller to a callee via advertisements according to one embodiment.

FIG. 1G illustrates a system to connect a caller to a callee via advertisements according to one embodiment. In FIG. 1G, a telephonic apparatus (103) that supports data communication is used to query for advertisements via a web service server (109) of a connection provider which has an advertisement database (111) and a connection server (113). The telephonic apparatus (103) may query the web service server (109) directly or via a listing server (105), which may have a separate listing database (107). In one embodiment, the listing server (105) may selectively serve listings/advertisements obtained from the listing database (107) and/or the advertisement database (111).

In one embodiment, the advertisements retrieved from the web service server (109) contain telephonic references, which can be used by the telephonic apparatus (103) to call the connection server (113). The connection server (113) identifies the telephone contact information of the corresponding advertisers based on the telephonic references called by the telephonic apparatus and further connects the call to the advertisers (e.g., 119).

In one embodiment, the telephonic apparatus (103) is a softphone implemented at least in part via software, such as an instant messenger, a VoIP client application running on a computer, an applet embedded in a web page, a built-in or plug-in module of a web browser, a handheld device, a personal digital assistant (PDA), a cellular phone, a cordless phone, a Bluetooth phone, a WiFi phone, etc. The telephonic apparatus (103) may be designed to make a connection based on Internet Protocol, based on a peer to peer network, based on software, and/or based on a connection to a server or a host computer, etc. In some embodiments, the telephonic apparatus (103) is implemented via hardware circuitry, such Application-Specific Integrated Circuit (ASIC); in some embodiments, the telephonic apparatus (103) is implemented partially via special purpose hardwire circuitry and partially via software, such as Application-Specific Integrated Circuit (ASIC) or Field-Programmable Gate Array (FPGA) with software/firmware; and in some embodiments, the telephonic apparatus are implemented using a set of general purpose hardwire components that are under the control of software.

In one embodiment, the telephonic references in the advertisements that are retrieved directly or indirectly via the web service server (109) are SIP URIs which contain encrypted information, such as the telephone number of the advertiser, an identifier of the caller, information about the query, the geographic area of the service of the advertisement, and/or the position of the advertisement in the sorted list of the search result, etc. The connection server (113) decrypts the SIP URI that is used to call the connection server (113) to further connect the call to the advertiser.

Alternatively, the information to be tracked, such as the telephone number of the advertiser, an identifier of the caller, information about the query, the geographic area of the service of the advertisement, and/or the position of the advertisement in the sorted list of the search result, etc., can be provided in the advertisement separately from the SIP URI of the connection server (or other types of telephonic reference of the connection server). For example, the information can be provided in an XML message/document. The telephonic apparatus (103) can construct a new SIP URI that includes the parameters to be tracked to call the connection server, or include the parameters in a field of the SIP message to initiate the call to the connection server, or provide the parameters to the connection server in a separate message during or after the initiation of the call.

Alternatively, the telephonic apparatus (103) is configured to call the telephone number of the advertiser directly and report the association between the call to the telephone number of the advertiser and the parameters to be tracked to the listing server (105) and/or the web service server (109).

Alternatively, the telephonic apparatus (103) is configured to send a message, including the parameters to be tracked, to the web service server (109) to request the connection server to call back to the telephonic apparatus (103) and to further connect the call to the advertiser (119).

Alternatively, the telephonic apparatus (103) is configured to send a message to the web service server (109) to decrypt the telephone number of the advertiser (101) and then call the telephone number of the advertiser (101) directly without going though the connection server (113). The message sent to request the web service server (109) to decrypt the telephone number of the advertiser (101) includes the parameters to be tracked; and decrypting of the telephone number of the advertiser (101) for the telephonic apparatus (103) can be considered as an initiation of a call to the advertiser (119).

In another embodiment, the telephonic apparatus (103) receives the information to be tracked but not the telephone number of the advertiser (101). A reference is provided to represent the telephone number of the advertiser (101). The telephonic apparatus (103) is configured to send a message to the web service server (109) to obtain the telephone number of the advertiser (101) via the provided reference and then call the telephone number of the advertiser (101) directly without calling though the connection server (113).

In one embodiment, the query of the telephonic apparatus (103) is submitted to the web service server (109) with an identifier of the caller, such as a telephone number of the caller, a user identifier of a telephonic apparatus, an internet address of the telephonic apparatus, a softphone user ID, a number unique to the softphone user ID among different softphone user IDs, etc. In one embodiment, the identifier of the caller is encrypted in the SIP URI. When the telephonic apparatus (103) calls the connection server (113) using the SIP URI, the connection server (113) can determine whether the call is made from the same telephonic apparatus that submitted the query. For example, the connection provider may prevent other telephonic apparatuses that did not perform the query from calling the advertiser (119) using the result of the query. The connection provider can also use the identifier information of the caller to determine whether a query is generated by a machine in an automated fashion and to determine whether the query and/or the calls from the caller should be blocked. For example, after an advertiser complains about a call from a caller, the connection server can block the queries and/or calls from the caller (e.g., for a period of time).

In one embodiment, the telephonic apparatus is capable of making a VoIP call but using a different protocol different from SIP; and a gateway (115) is used to interface the telephonic apparatus and the connection server (113). In another embodiment, the telephonic apparatus is capable of making a SIP call using the SIP URI to reach the connection server (113) without the gateway (115). In one embodiment, the telephonic apparatus makes a call over a Public Switch Telephone Network (PSTN); and a telecommunication carrier bridges the call from the PSTN to the connection provider on a data network.

In one embodiment, the advertiser (119) uses a telephone that is connected on the Public Switch Telephone Network (PSTN); and the connection server (113) uses the gateway (117) to reach advertiser (119). In one embodiment, the gateway (117) is operated by a telecommunication carrier of the connection provider. In one embodiment, the connection server (113) uses the gateways (115 and 117) to set up the call and direct the gateways (115 and 117) to make a direct media connection that does not go through the connection server (113) to provide the telephonic connection between the caller (101) and the advertiser (119). In one embodiment, the advertiser (119) uses a telephone that is connected on a data network; and the gateway (117) is used to bridge the protocol used by the telephone of the advertiser (119) and the protocol used by the connection server (113). In another embodiment, the telephone of the advertiser (119) and the connection server (113) may use the same protocol; and the connection server (113) can call the telephone of the advertiser (119) directly (e.g., via SIP) without a gateway (117).

In one embodiment, the connection provider charges the caller on behalf of the advertiser for services provided by the advertiser over the telephonic connection established via the advertisement. In one embodiment, the connection provider charges the advertiser an advertisement fee per connection made via the advertisement. The advertiser may place a bid price for the advertisement fee; and the bid price can be used in ranking the advertisements in the set of search results that match with the query. In one embodiment, the bid price can be in the form of a maximum bid; and the actual bid is determined based on the bid price that is ranked next to the advertisement in the ranked search results.

In on embodiment, the telephonic apparatus (103) obtains listings directly or indirectly via a web service server (109) of the connection provider. The telephonic apparatus may also obtain listings from other sources (e.g., listing database 107) and selectively present the listings in response to a search request from the caller.

In one embodiment, the listings from the database (107) are provided without an advertisement fee; and the advertisement fee generated from the advertisements from the advertisement database (111) are shared between the operator of the listing server (105) and the connection provider. In one embodiment, the listing server (105) is used as a channel of a demand partner of the connection provider for distributing advertisements to the callers.

In one embodiment, the connection provider encrypts information related to the search, the advertiser's telephonic contact information, the caller's identification information, the ID of the listing server (105), etc. in the SIP URI which can be called by the telephonic apparatus (103) to reach the connection server (103). Alternatively, other types of telephonic references can be used, such as telephone numbers with extensions, VoIP user identifiers, etc. The information can be encrypted/encoded in the telephonic references provided in the advertisements. Alternatively, the telephonic references can be used in a database to look up the associated information such as the advertiser's telephonic contact information, the keywords used in the search, caller's identification information, the ID of the listing server (105), promotions/electronic coupons provided with the advertisement, etc.

In one embodiment, the SIP URI provided in the advertisement via the web service server (109) can be used to call the connection server (113) for a telephonic connection to the advertiser (119). The SIP URI contains information in an encrypted string (e.g., sip:<Encrypted String>@sip.ingenio.com), such as information about the advertiser, information about the user who performed the query, information about the demand partner who distributes the hardware and/or the software of the telephonic apparatus and/or who distributes the advertisements to the telephonic apparatus (103), and information about the query, such as a search term used in the query, the timestamp of the search, the order number of the advertisement in the result set, an identification of the advertisement, promotions/electronic coupons provided with the advertisement, etc. The telephonic apparatus (103) is connected to the connection server (113) at the SIP "end point," before being further connected by the connection server (113) to the advertiser (119).

In one embodiment, the telephonic apparatus (103) is configured to have the capability to store or bookmark the SIP URI provided in the advertisement. For example, the SIP URI can be stored in association with the advertisement or advertiser in a contact book maintained on the telephonic apparatus.

In one embodiment, a gateway (115) is used to bridge the call from the telephonic apparatus (103) that is in one VoIP domain (e.g., based on a proprietary protocol for VoIP) and the connection server (113) that is in another VoIP domain (e.g., based on an open standard VoIP protocol).

In one embodiment, the SIP URI is provided as a communication reference which can be used directly by the telephonic apparatus (103) to call the gateway (115) which further connects the call to the connection server (113). For example, when the telephonic apparatus is configured generally to initiate calls to traditional telephone numbers or VoIP user IDs (e.g., via a proprietary protocol), the telephonic apparatus can be configured to treat the SIP URI as a VoIP user ID associated with the gateway. Alternatively, a portion of the SIP URI (e.g., the encrypted string) can be used as VoIP user ID to reach the gateway.

In one embodiment, the listing server (105) is used to provide advertisements/listings to the telephonic apparatus (103). The listing server (105) is configured to obtain advertisements/listings from the web service server (109) of the connection provider and/or other sources. The listing server can be further configured to dynamically assign VoIP user IDs to the SIP URIs such that when the assigned VoIP user IDs are called by the telephonic apparatus (103), the call is routed to the gateway (115) for further connection to the connection server (113) of the connection provider via the SIP URI. For example, the listing server may dynamically generate the VoIP user IDs based on the SIP URIs such that the SIP URIs can be computed based on the dynamically assigned VoIP user IDs. Alternatively, the dynamically assigned VoIP user IDs may be associated with the SIP URIs via a database.

In another embodiment, the web service server (109) provides the advertisement with a traditional telephone number instead of the SIP URI. The traditional telephone number may or may not include an extension. The telephonic apparatus (103) uses the gateway (115) to access PSTN and reach the connection server (113) via a telecommunication carrier which bridges the call from the PSTN to the connection server (113). The telecommunication carrier may provide the call to the connection server (113) via a SIP call. In one embodiment, the extension is to be dialed by the telephonic apparatus after the telephonic connection between the telephonic apparatus (103) and the connection server (113) is established. In another embodiment, the extension is to be dialed by the gateway (115). In a further embodiment, the gateway (115) places a SIP call to the connection server (113), bypassing the telecommunication carrier of the connection provider; and the extension is used to construct the SIP URI of the call (or be included in the SIP INVITE message sent from the gateway (115).

In one embodiment, the gateway (115) used to bridge the call to the PSTN may prevent the connection server (113) from identifying the caller via ANI (Automatic Number Identification (ANI) service. To provide information to identify the caller, the gateway (115) can be further configured to provide the information about the caller to the connection provider via call ID information or via extension. Alternatively, the gateway (115) may bypass the telecommunication carrier and connect the call to the connection provider via a SIP call and provide the information about the caller in the FROM header of the SIP INVITE message.

In one embodiment, when a gateway (115) is used to bridge one protocol used by the telephonic apparatus (e.g., a proprietary protocol) and another protocol used by the connection server (e.g., SIP), the telephone network is configured to selectively route the call to the gateway to reduce latency or balance load. The telephonic apparatus (103) can use other gateways (not shown in FIG. 1G) to reach other callees.

In one embodiment, the telephonic apparatus (103) is configured to identify the geographic area of the telephonic apparatus to the connection provider; and the connection provider can return advertisements/listings based on the geographic area of the telephonic apparatus and/or selectively block the calls from customers who are outside the service area of the advertisers.

In one embodiment, the listing server (105) and the listing database (107) (and/or the web service server (109) and the advertisement database (111)) can be implemented via a peer to peer network. In one embodiment, the listing server (105) is not used. In one embodiment, the web service server (109) is not used. In one embodiment, the advertisement database (111) may include free listings. In one embodiment, the listing database (107) may include advertisements for which the advertisers are charged based on the telephonic connections provided via the advertisements.

The methods to track the correlation between the query information and the resulting telephonic connections to callees of the listings of the listing database (107) can also be used in similar ways described above for tracking the correlation between the query information and the resulting telephonic connections to the advertiser (119). For example, encrypted tracking information can be provided to the telephonic apparatus (103) for listings retrieved from the listing database (107); and the correlation information determined at the connection server (113) can be transmitted to the listing server (106) for decrypting/decoding. Alternatively, the telephonic apparatus (103) can be configured to report the correlation to the listing server (105). Alternatively, the gateway (115) is configured to report the correlation to the listing server (105).

Figure 2:
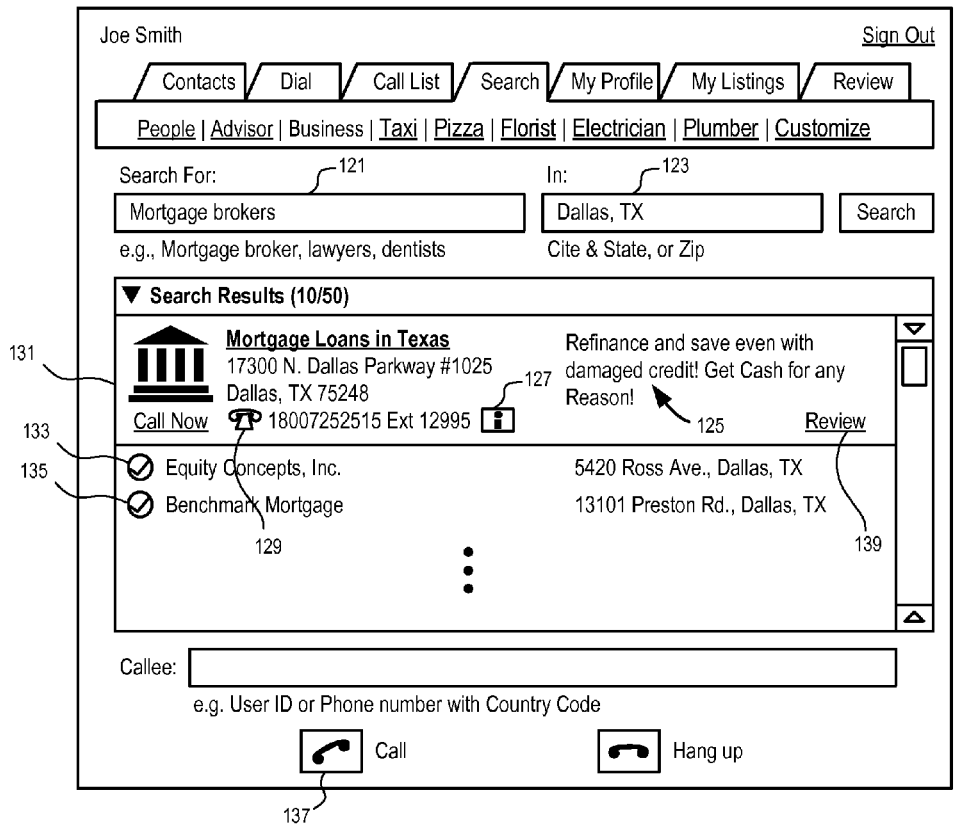
FIG. 2 illustrates a VoIP application for accessing an advertiser according to one embodiment.

FIG. 2 illustrates a VoIP application for accessing an advertiser according to one embodiment. The interface as illustrated in FIG. 2 may be presented as a standalone application or as an applet running inside a web browser. Alternatively, a telephonic apparatus that has data communication and processing capabilities and the capability to dial a call via a connection to PSTN or a cellular communication network can also be designed to have the user interface similar to that illustrated in FIG. 2.

In FIG. 2, for example, a user may select a "Search" tab to search for listings. The search result may include advertisements retrieved from the web service server (109) and/or the listings retrieved from database (107). In one embodiment, the listing server (105) performs the integration of the listings obtained from the listing database (107) and the listings obtained from the advertisement database (111) for presentation on the telephonic apparatus (103).

In one embodiment, the listings maintained in the listing database (107) are created and edited by the community of users of telephonic apparatuses similar to the telephonic apparatus (103). The users can provide, edit, and/or modify a description, comments, ratings, etc., about a business or service provider that is identified by a telephonic reference, such as a telephone number of the business or service provider. Alternatively, the listings may have a portion of description that can be edited by the respective advertiser but not by other users.

In one embodiment, the listings maintained in the advertisement database (111) is created by the advertisers. The connection provider can also maintain information about customer feedbacks and ratings for the services and/or products offered by the advertisers.

In one embodiment, the listing server (107) may also collect users' description, comments and ratings for the services and/or products offered by the advertisers of the advertisements of the database (111). In one embodiment, the listing server (105) further maintains data that represents a social network among members of the community of users of the telephonic apparatuses; and the listing server (105) may selectively present the listings based on a trustworthy indicator determined based on the social network and/or present the comments, recommendations, feedbacks, ratings, etc., based on the social distance between the caller (101) and the users who made the comments, recommendations, feedbacks, ratings.

In one embodiment, a user can select the "Contacts" tab in FIG. 2 to manage contact information. For example, the user can use the contact management interface to store/edit a set of telephonic references which can be used to call friends and family using the telephonic apparatus without going through the connection server (113).

In one embodiment, the user may also select the "Contacts" tab to specify friends of the user as the direct social connections in the social network and/or a trustworthiness indicator of the entities listed in the contact book of the user. Using the social network data, a trustworthiness indicator can be computed for users who are indirectly connected in the social network (e.g., the largest product of the trustworthiness indicators along any social connection path between the two users). The trustworthiness indicator can be used to select advertisements, comments, recommendations, ratings from the point of view of the user of the telephonic apparatus.

In one embodiment, the contact information is maintained for the user of the VoIP terminal (e.g., telephonic apparatus 103). A contact information entry can include a phone number or a user ID for the VoIP application or a SIP URI. Using the VoIP application on the computing/communication device (e.g., a personal computer, a palm top computer, a notebook computer, a personal digital assistant (PDA), or a special purpose device, such as a VoIP compatible phone, etc.), the user can make a telephonic connection to a remote user. The remote user may use a landline phone, a mobile phone, or a VoIP application (e.g., a personal computer, a palm top computer, a notebook computer, a personal digital assistant (PDA), or a special purpose device).

In one embodiment, the user may select a "Dial" tab in FIG. 2 to directly enter the information (e.g., the ID of the remote user for the VoIP application, or the phone number of the remote user) for "dialing" the VoIP call and select the "Call List" tab to view a history of calls placed or received via the telephonic apparatus.

In one embodiment, the user can select the "My Profile" in FIG. 2 to indicate the geographic location and/or other preferences of the user and select the "My Listings" to create an advertisement or listing of the user.

In one embodiment, the user can select the "Review" tab in FIG. 2 to edit the description of a listing from the listing database (107), to provide recommendations, comments, ratings, etc. for listings from the listing database (107) or from the advertisement database (111). In one embodiment, the user can also select the "Review" tab (or link 139) to provide comments, recommendations, feedbacks, ratings on an advertisement obtained from the advertisement database (111).

In FIG. 2, the graphical user interface includes a "Search" tab which can be selected to perform a search of people, advisor, business or predefined categories of services, such as taxi, pizza, florist, electrician, plumber, etc. In FIG. 2, the user can input key words (e.g., "Mortgage brokers") in the entry box (121) under the label "search for" to perform a search for a specific category. In the entry box (123) under the label "In:", the user can input the information about the specific geographic area (e.g., "Dallas, Tex."). For example, a keyword to category algorithm queried with service area returns relevant advertisers, such as "Mortgage Loans in Texas" (131), "Equity Concepts, Inc." (133), "National Mortgage Broker & Bank" (135), etc.

In one embodiment, some of the advertisements/listings in the search result are retrieved from the advertisement database (111) (e.g., top one or three or five of the search results are from the advertisement database (111)) and some are from the listing database (107). In one embodiment, separate areas are used to show the listings retrieved from the advertisement database (111) and the listings retrieved from the listing database (107).

In one embodiment, the advertisers are served based on the amount of bids the advertisers placed on the advertisements. For example, the highest bidders matching the search criteria are displayed above and/or before other bidders matching the search criteria are displayed.

In one embodiment, one or more advertisements retrieved from the advertisement database (111) are presented above a set of matching listings retrieved from the listing database (107).

In FIG. 2, when an advertisement entry (e.g., "Mortgage Loans in Texas") (131) is selected, the entry is expanded to reveal more advertisement message for the advertiser (e.g., "Refinance and save even with damaged credit! Get Cash For Any Reason!" (125)). In one embodiment, the expanded entry includes a phone icon (129) which can be selected to initiate a VoIP telephonic connection with the advertiser using the VoIP application. The user may also use the main phone icon (137) to initiate the call to the phone number associated with the selected, expanded entry. The VoIP telephonic connection may be made to a regular landline phone, or a mobile phone, or VoIP terminal. For example, the VoIP telephonic connection may be made through a VoIP application to a phone over a landline, over a cellular communication line to a cellular phone, or over a data communication link (e.g., Internet) to another VoIP application.

In one embodiment, the phone icon (129) includes a SIP URI assigned to the advertisement, which when selected causes the VoIP terminal to call the connection provider using the SIP URI directly, or indirectly via a gateway (e.g., 115).

In one embodiment, the advertisement (131) also includes a telephone number assigned by the connection provider to the advertisement (131). The telephone number may include an extension, which is to be dialed by the VoIP terminal after being connected to the connection provider. Alternatively, a gateway (115) may provide the extension number in the SIP INVITE message without actually dialing the extension. In another embodiment, the telephone number is included in an icon (e.g., 129) without being displayed to the user. In one embodiment, the telephone number is to be used by the VoIP application to construct a SIP URI for a direct SIP call to the connection server (113) (or a SIP gateway 115).

In one embodiment, during the phone call the VoIP application displays the call duration and other information about the advertiser, such as the logo of the advertiser, the pricing information of the advertiser, etc. In one embodiment, the advertiser charges the user of the VoIP application with a per minute price, which is displayed during the phone call. Alternatively, the advertiser pays the operator of the VoIP application and/or the advertisement provider (distributor) based on a pay per call price bid. In one embodiment, the user interface displays the balance of an account which can be used to pay for the charges related to the call.

In one embodiment, the user/consumer calls the advertiser using the VoIP application. The phone call is connected to a phone connection server (e.g., of an advertisement provider, which may be the same as, or different from, the service provider of the VoIP application). The phone connection server further connects the phone call to the advertiser. In one embodiment, a separate phone call is placed to the advertiser; and the phone call from the consumer is connected with the phone call with the advertiser.

In one embodiment, the consumer's request to call the advertiser is transmitted to a phone connection server, which makes separate calls to the consumer and the advertiser and joins the separate calls to connect the consumer and the advertiser.

In one embodiment, the VoIP application system determines the communication parameters for the devices of the caller and the callee. Using the communication parameters, the VoIP application on the caller's device and the VoIP application on the callee's device can directly make a communication connection for the VoIP call. In one embodiment, at least one of the VoIP applications is programmed to report the duration of the call to a server which records the call duration. In one embodiment, the online presence information/availability status of the VoIP applications on the network is relayed on a distributed, decentralized network to avoid the use of a central server. Alternatively, a centralized server may be used to facilitate the connections.

In one embodiment, the phone connection server prevents the consumer and the advertiser from gaining information about the other party from the phone connection. The advertiser is not provided with the telephonic information about the consumer (e.g., the VoIP user ID of the consumer, a phone number of the consumer) in making the phone connection; and the consumer is not provided with the telephonic information about the advertiser (e.g., the VoIP user ID of the advertiser, a phone number of the advertiser). Thus, anonymity of the call is maintained (if the advertiser and the consumer do not reveal their telephonic information during the conversation).

In one embodiment, the advertisement provider/distributor charges the advertiser based on the advertiser's current bid for the phone lead in the category and service area that matches the search submitted by the user of the VoIP application. A caller algorithm of the advertisement provider prevents multiple charges. For example, if calls to the advertisement provider from the user of the VoIP application is within a certain time window, such as an hour, a day or a week, these calls may be considered as providing the same phone lead to the advertiser; and the advertiser is charged for only one phone lead.

In one embodiment, a fraud detection system is deployed for the advertisement provider to detect the abuse of the system. For example, the system may detect and stop the use of pay per call advertisement bids as a way to obtain long distance phone calls to a landline phone or a mobile phone.

In one embodiment, the telephonic information about the advertiser is provided to the VoIP application indirectly. For example, instead of providing the regular business phone numbers of the advertiser (e.g., for landline phones or mobile phones), the advertisement provider embeds in the advertisement a phone number, or a reference to the phone number (e.g., a user ID of the VoIP application system) that can be used to reach the phone connection center of the advertisement provider. When the telephonic connection to the advertiser is initiated by the user of the VoIP application, the VoIP application connects to the call connection server, which looks up the contact information of the advertiser and further connects the call to the advertiser. In one example, the call connection server may obtain the phone number of a landline phone or a mobile phone, make a call to the phone number of the advertiser (e.g., partially through a VoIP connection, or through a traditional telephonic connection), and join the call to the advertiser and the call from the user to make the connection. In another example, the call connection server may obtain a VoIP user ID of the advertiser, make a VoIP connection to the advertiser, and join the VoIP connections to connect the advertiser and the user.

In one embodiment, the advertisement provider assigns different phone numbers, or VoIP user IDs, to different advertisements and/or different advertisers for the connection center so that the connection center can look up the telephonic contact information for the corresponding advertisements and/or advertisers. The differences in the phone numbers for different advertisements and/or different advertisers may be in the main phone number (dialed before a connection to the connection center is made), or in the extension of the phone number (dialed after a connection to the connection center is made).

In one embodiment, the connection server of the advertisement provider is integrated with the server of VoIP application. The advertisement contains an ID similar to, or corresponding to, a VoIP user ID. When the server of the VoIP application receives the ID of the advertisement in response to the user's request to telephonically connect to the advertiser (e.g., when a button or a link is selected by the user, the request for a connection is generated; and the ID of the advertisement embedded in the advertisement is automatically transmitted to the server by the VoIP application), the server of the VoIP application looks up the contact information (e.g., the phone number, or the VoIP user ID of the advertiser, etc.) from the advertisement database to connect the phone call to the advertiser in a way similar to that the connection center connects the caller and the advertiser.

In one embodiment, when the user inputs a request to initiate the phone call, the VoIP user ID of the user (or the equivalent information for making a VoIP connection to the user) is transmitted to the connection center together with a reference to the advertiser and/or the advertisement. The connection center then starts the VoIP connection to the VoIP application of the user and a separate connection to the advertiser. The connections are joined to connect the user and the advertiser. The separate connection to the advertiser may be via VoIP, or via regular circuit switched call, or via VoIP for part of the transmission path and via a circuit switched network for the remaining part of the transmission path.

In one embodiment, the expanded entry further includes an information icon (e.g., 127 in FIG. 2), which can be selected to provide a profile page about the advertiser. For example, the profile page may include the business hours of the advertiser, a description of the advertiser, payment methods accepted by the advertiser for purchasing products/services, categories under which the advertiser is listed, a map showing the location near the advertiser, and/or a link to view map details about the location near the advertiser, etc.

In one embodiment, the advertiser can specify the schedule to receive calls from customers. The advertisement includes an indication whether the advertiser is currently scheduled to receive calls at the time the advertisement is presented. For example, different icons can be presented to indicate the availability. For example, the text "Call Now" or "Schedule a Call" can be used to indicate the availability according to the schedule.

Figure 3A:
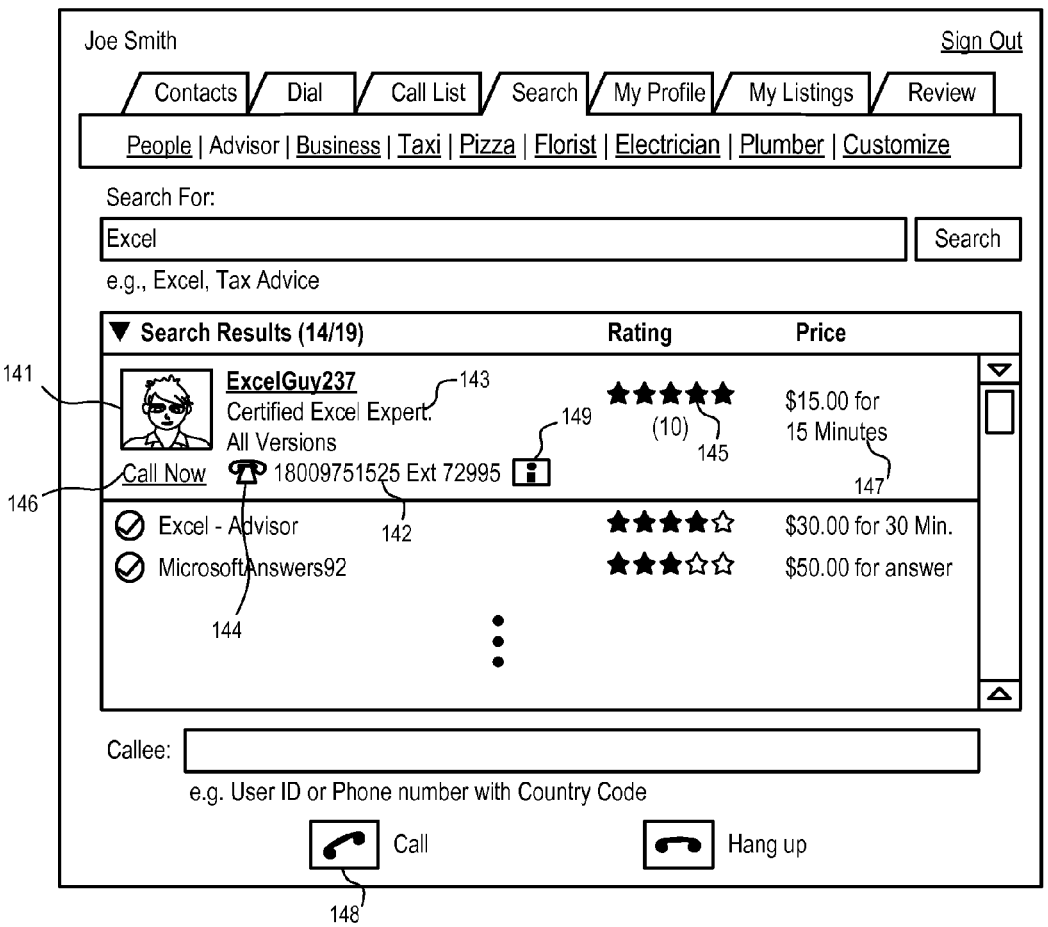
FIGS. 3A-3B illustrate examples of a VoIP application for accessing an advisor according to one embodiment.

FIG. 3A illustrates a VoIP application for accessing an advisor according to one embodiment. Similar to searching pay per call advertisers (e.g., according to service category and/or service area), a user of the VoIP may also search advisors using the VoIP application. For example, in FIG. 3A, the user may enter one or more key words (e.g., "Excel") in the search box under the heading "search for" to indicate the requirement for the desired advisors.

In one embodiment, the advisors set their own rates for providing services, such as advice, entertainment, celebrity conversations or other types of paid access, over the telephone link. The search result of the advisors may include entries of advisors. In one embodiment, when expanded an advisor entry shows a photo image (141) of the advisor, a description (143) of the expertise of the advisor, the rating (145) based on the experience of prior activity of the advisor, the price (147), etc.

In one embodiment, the expanded entry further includes an information icon (149), which can be selected to provide a profile page about the advisor. For example, the profile page may include the expertise of the advisor, the rate, a detailed description, and previous consumer feedback information, such as rating, comments, recommendations, etc.

In one embodiment, during the telephone conversation, the VoIP application displays the rate for the advisor (e.g., $15.00 for 15 min), the duration of the call, the remaining minutes (when applicable), etc. In one embodiment, the VoIP application also displays the balance amount available in an account which is designated for paying for the call.

In one embodiment, the entry of the advisor can be added to the contact collection of the user of the VoIP application in a way similar to those described for an advertiser entry (e.g., automatically add the advisor into the contact list after the advisor is called).

FIG. 3A shows an example of a user interface in which a telephone number (142) with an extension is displayed for the advisor. The user can call the advisor via selecting the "call now" link (146) or the telephone icon (144) of the listing, or selecting the call button (148) while the listing is being selected/highlighted. Alternatively, the user may use a different telephonic apparatus (e.g., a cellular phone, a landline phone, a plain old telephone set) to dial the telephone number (142) to reach the advisor.

Figure 3B:
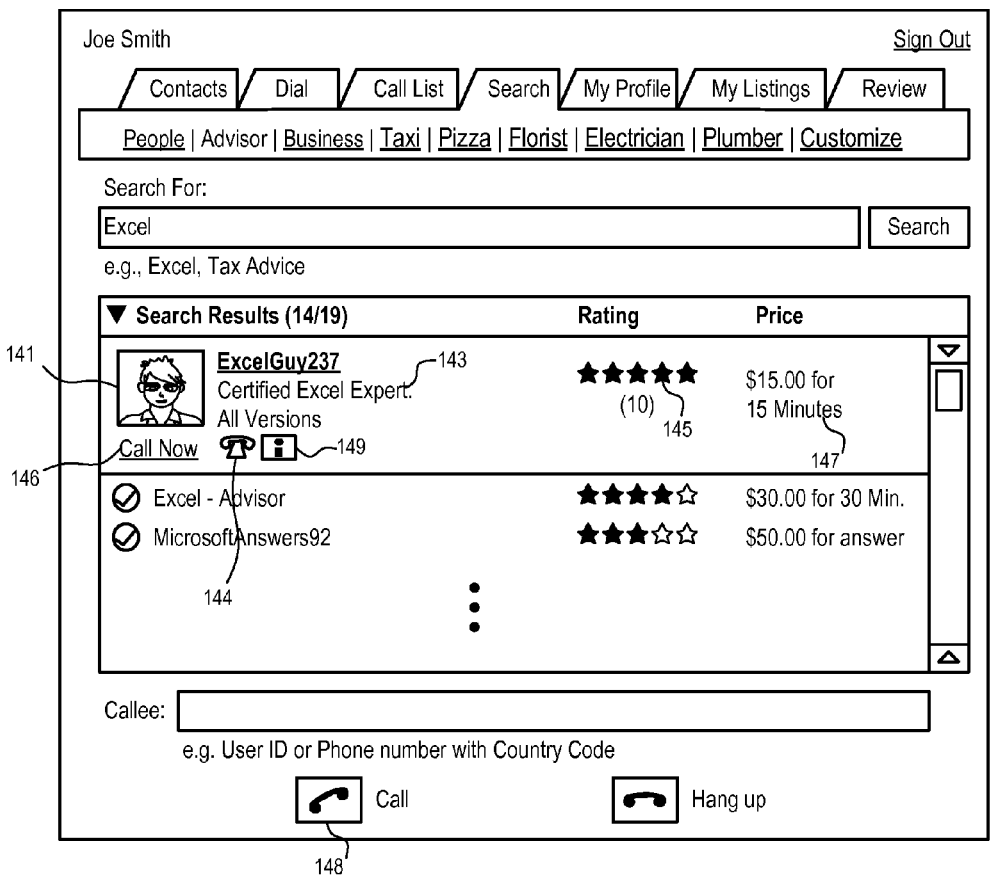

FIG. 3B shows an example of a user interface in which the telephonic reference of the advertiser is not explicitly displayed. The user is encouraged to call the advisor via selecting the "call now" link (146) or the telephone icon (144) of the listing, or selecting the call button (148) while the listing is being selected/highlighted.

Figure 4:
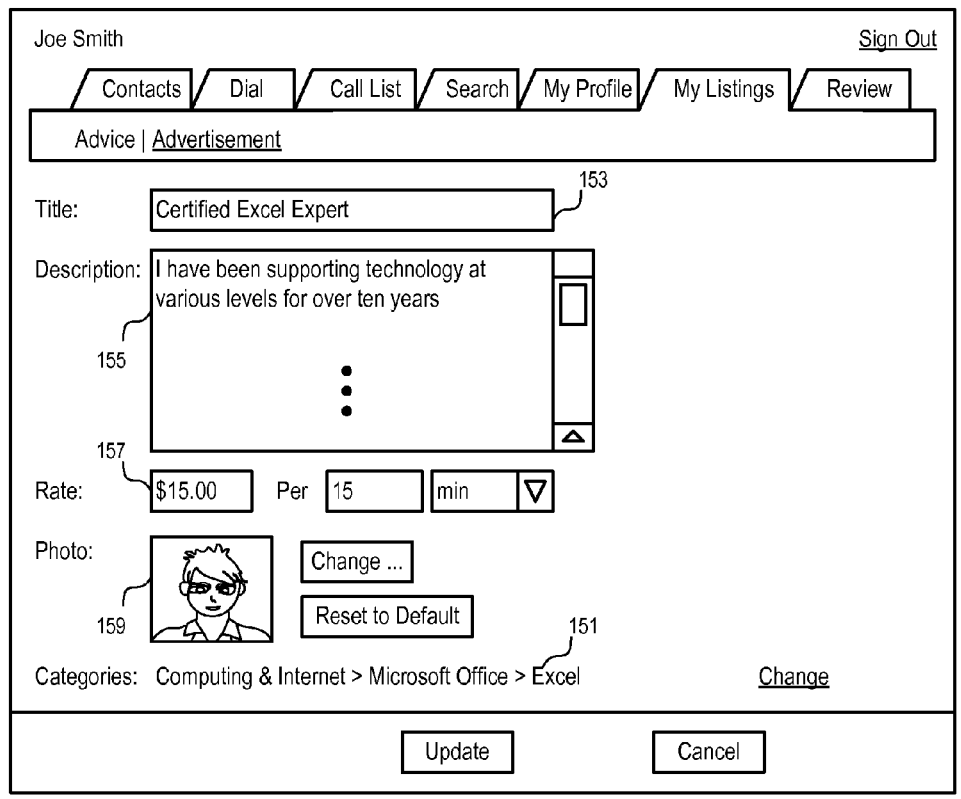
FIG. 4 illustrates a user interface of a VoIP application for managing advertisements according to one embodiment.

FIG. 4 illustrates a user interface of a VoIP application for managing advertisements according to one embodiment. In FIG. 4, the user of the VoIP application can also be an advisor in the advisor providing system. The user can be presented as an advisor. Using the "My Listing" tab, the user can enter the information about the user as an advisor for the network. The advisor information is collected to present in listings and on profile page. In one embodiment, the advisor information includes title (e.g., a name) (153), description (155), rate (e.g., prices) (157), photo (159), categories (151) of the advice service.

In one embodiment, the listing created via the interface as illustrated in FIG. 4, is maintained by the listing server (105). Alternatively or in combination, the created listing can be submitted to the advertisement database (111) via the web service server (109). In one embodiment, the user is charged an advertisement fee when a customer is connected to the user via the listing. Alternatively or in combination, the user is charged a percentage of the service fees the user charges the customer as a commission fee for connecting the customer and the user.

In one embodiment, the VoIP application uses the application program interface (API) of the advisor listing provider (e.g., Ingenio) to create listings within the VoIP application.

In one embodiment, an extensive reporting suite provides the VoIP application and the advertiser the tools to see how their listings are performing and make adjustments to maximize their Return on Investment (ROI).

FIG. 5 illustrates a user interface for the creation of an advertisement according to one embodiment. The user interface may be presented via web in a web browser or in the VoIP terminal. In one embodiment, the telephonic apparatus (103) is configured to communicate with the web service server (109) to generate and/or edit the advertisement in the database (111) using the interface (161). Alternatively, the telephonic apparatus (103) may communicate with the web service server (109) via the listing server (105).

In FIG. 5, an interface (161) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (161) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 5, the interface (161) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording can be stored in the database for a period of time and deleted if not used after a predetermined period of time, or when the usage of the audio advertisement is lower than a threshold.

Figure 6:
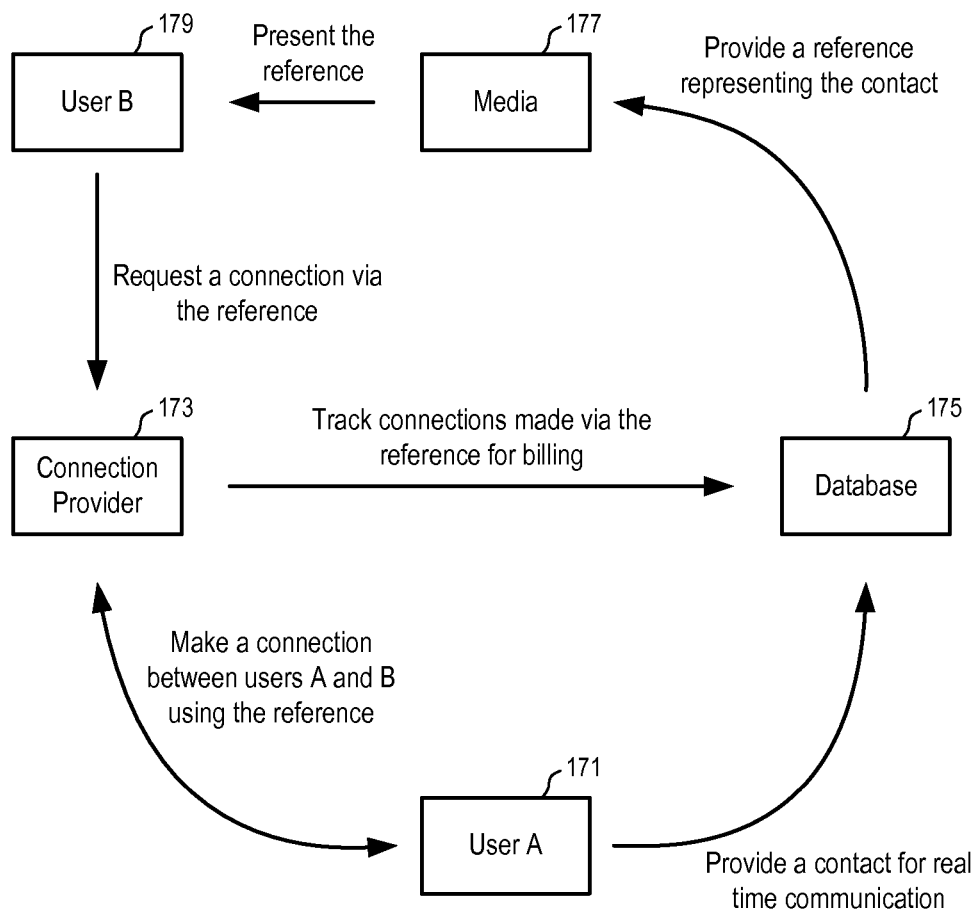
FIG. 6 shows a method to establish connections for real time communications according to one embodiment.

FIG. 6 shows a method to establish connections for real time communications according to one embodiment. In FIG. 6, user A (171) provides a contact for real time communication, such as a telephonic reference of the user A. The contact can be used to establish a connection with user A (171) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (171) is stored in the database (175); and a reference is assigned to represent the contact. Instead of providing the contact to customers, the reference representing the contact is provided through the media (177) to user B (179). Thus, when the user B (179) uses the reference to request a connection with the user A (171), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 6, the user B (179) can use the reference obtained from media (177) to request the connection provider (173) to establish a connection or facilitate a communication channel for real time communications between the user A (171) and the user B (179). The connection provider uses the database (175) to determine the contact of the user A (171) and then make a connection between the user A (171) and user B (179) using the contact of the user A (171). Alternatively, the reference may include an encoded/encrypted version of the contact of the user A (171) which can be decoded/decrypted without relying upon the database (175).

In response to the user B's request for a connection, the connection provider (173) may establish two separate connections to the user A (171) and the user B (179) and then bridge the two connections to connect the user A (171) and user B (179). For example, the connection provider (173) may determine the reference from a connection established between the user B (179) and connection provider (173) and then further bridge the connection to the user A (171).

In one embodiment, the connection provider (173) may provide a separate reference to represent the user B (179) and allow the user A (171) to subsequently callback to the user B (179) via the reference that represents the user B (179), if the user A (171) is not currently available for real time communications. The connection provider (173) may schedule an appointment for the user A (171) and user B (179) for a real time communication session. The connection provider (173) may send a notification to the user A (171) to inform the user A (171) about the request for a real time communication.

In one embodiment, the connection provider (173) tracks the connections made via the reference for billing for the advertisement. For example, the connection provider (173) may charge the advertiser for each communication lead deliver to the user A (171).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

Figure 7:
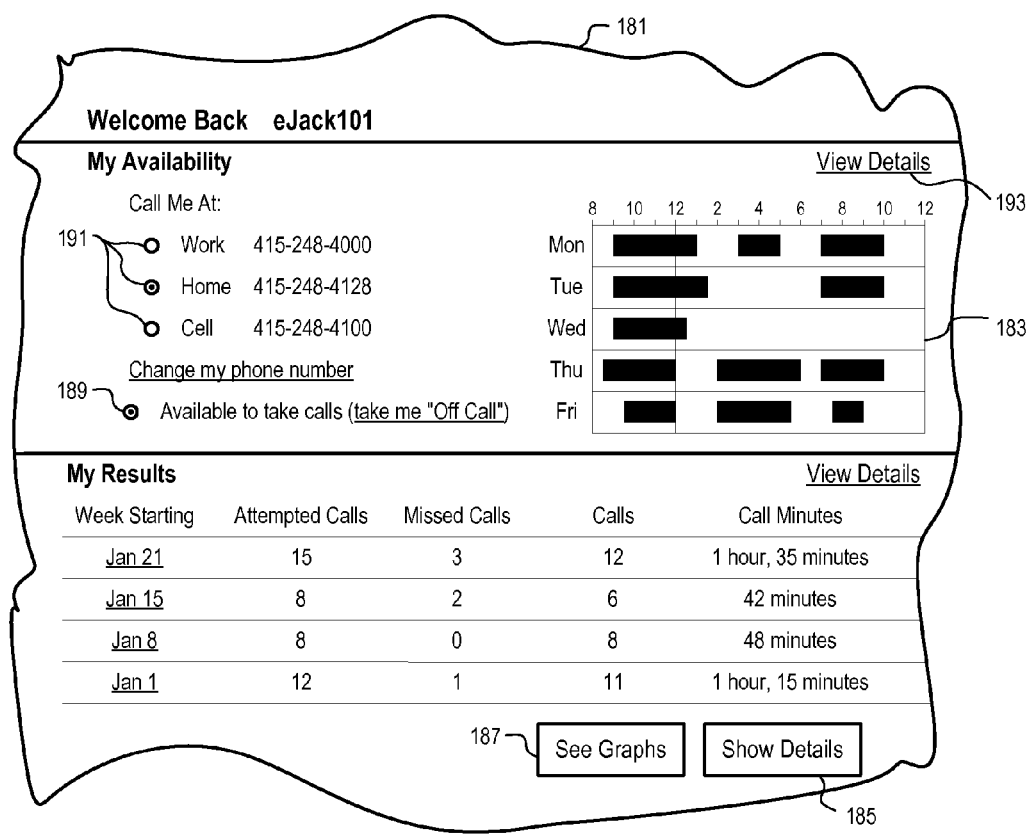
FIG. 7 illustrates an example of a user interface to manage availability for receiving phone calls according to one embodiment.

FIG. 7 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 7, the advertiser/seller may choose a preferred phone number from a set of phone numbers of the seller to receive incoming calls using the option group (191) in the user interface (181). The seller may indicate whether the seller is currently available to take calls or is to be taken "off call" (e.g., using the check box (189)).

In one embodiment, the system allows the seller to specify the schedule to receive calls; and the schedule (183) is displayed to the seller in a graphical way to help the seller to manage calls. In FIG. 7, the user interface (181) includes a link (193) which can be selected to display a user interface (not shown in FIG. 7) to manage the schedule (183).

In one embodiment, when the schedule or the check button (189) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 7, the user interface (181) also includes a summary of call activities. Buttons (187 and 185) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 8:
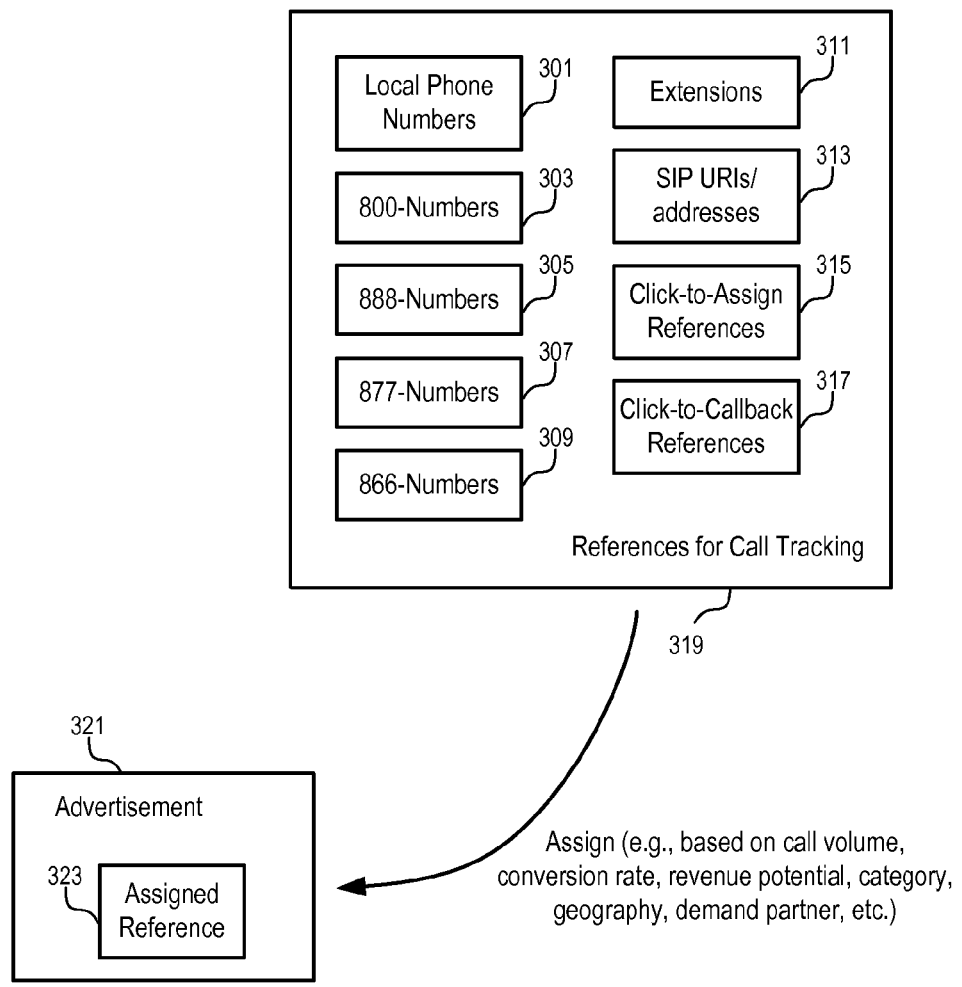
FIG. 8 shows a diagram illustrating a method to select a type of tracking mechanism with a corresponding reference for embedding in an advertisement according to one embodiment.

FIG. 8 shows a diagram illustrating a method to select a type of tracking mechanism with a corresponding reference for embedding in an advertisement according to one embodiment. In FIG. 8, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 8, a pool (319) of different types of references are maintained, such as local phone numbers (301), 800-numbers (303), 888-numbers (305), 877-numbers (307), 866-numbers (309). Some of the references can be dynamically generated and used, such as extensions (311), SIP addresses (313), click-to-assign references (315) and click-to-callback references (317). In one embodiment, one or more of the references are selected and used as the assigned reference (323) that is embedded in the advertisement (321). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner, or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement of being called is estimated based on the type of media channels used to present the advertisement, the demand partner responsible to deliver the advertisement, and/or the customer who views the advertisement. Any characteristics in advertising that have an impact on the likelihood of an advertisement of being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 9:
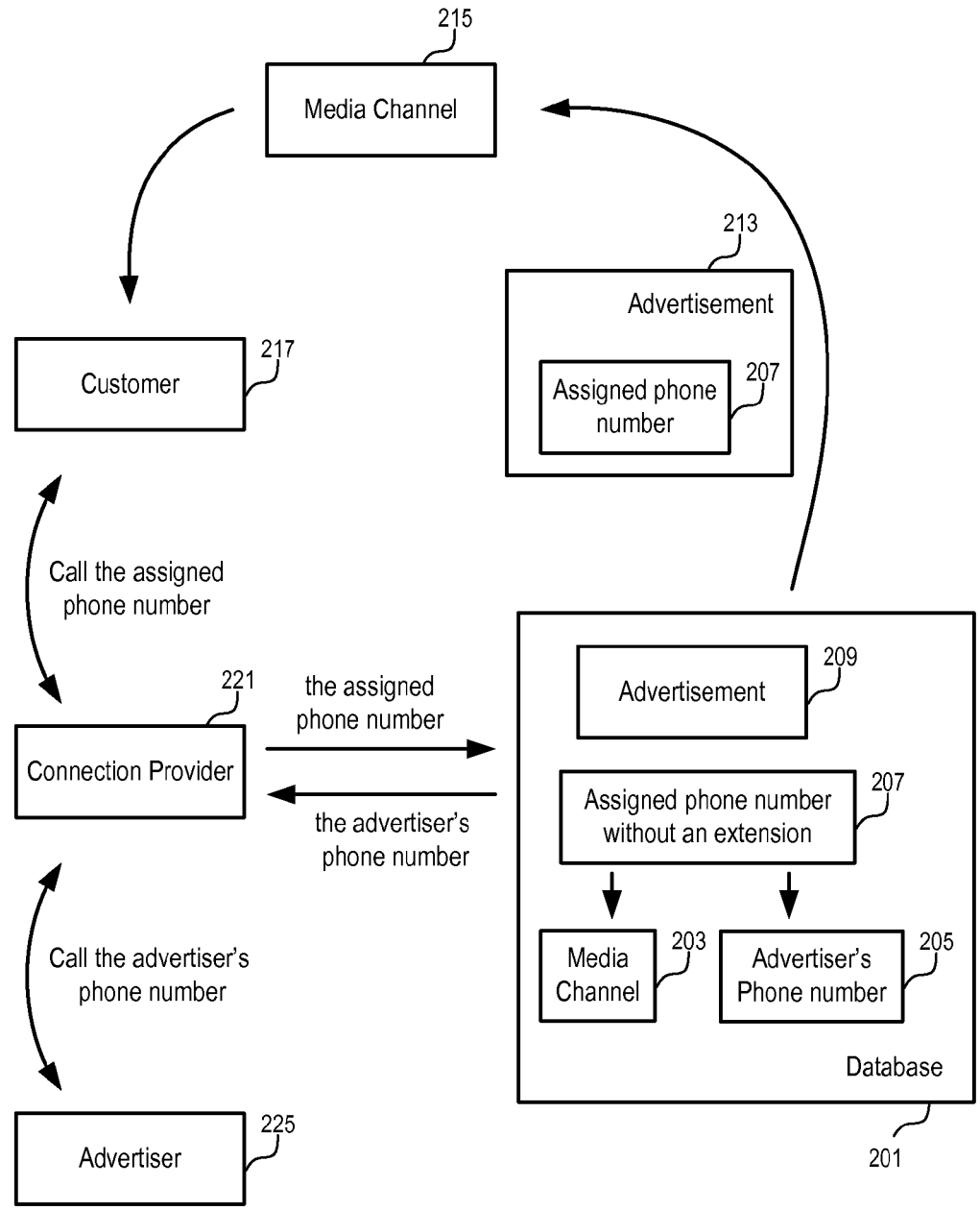
FIG. 9 illustrates an example of telephone call tracking mechanisms which can be selected according to one embodiment.

FIG. 9 illustrates an example of telephone call tracking mechanisms which can be selected according to one embodiment.

In FIG. 9, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800-(888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 10:
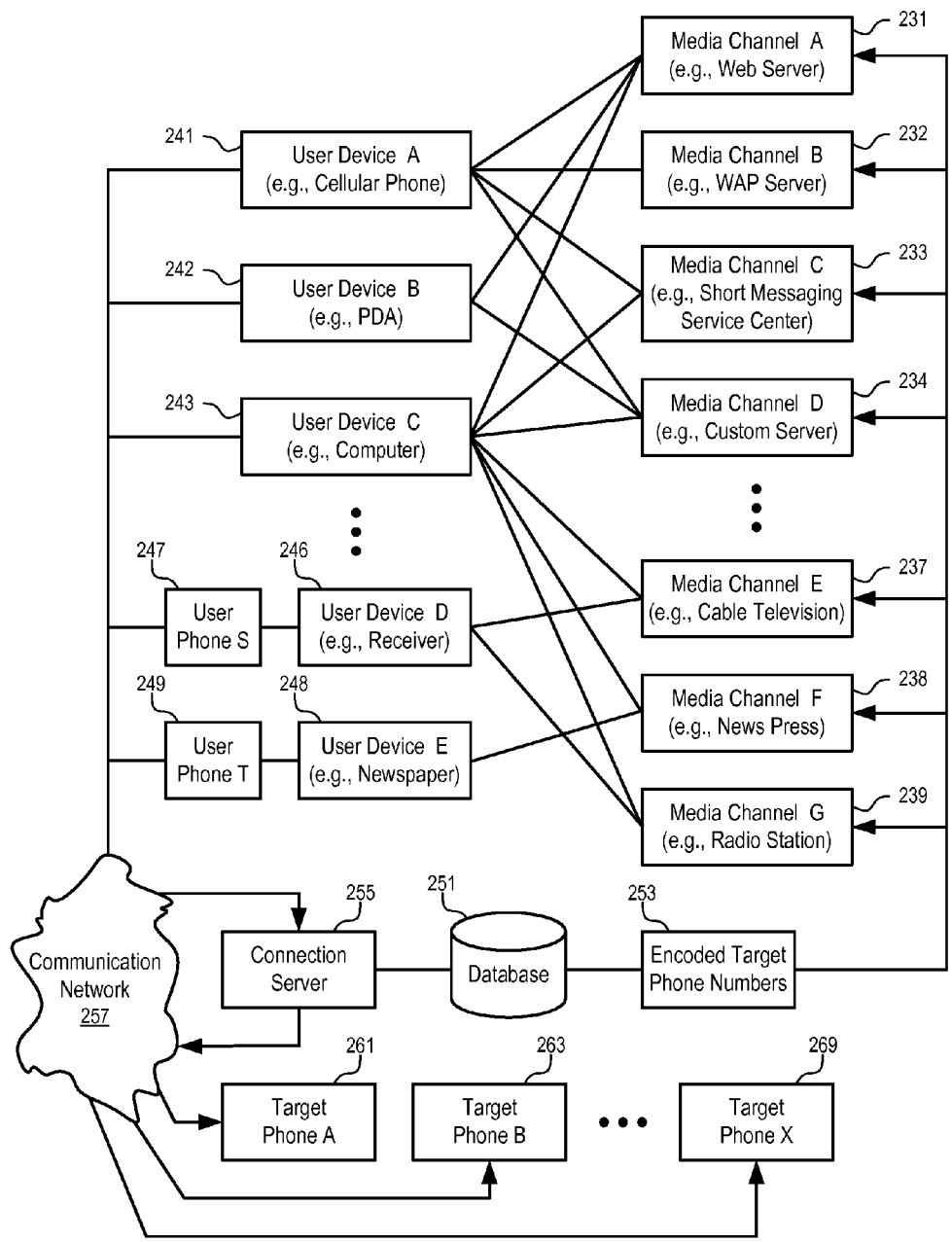
FIG. 10 shows a diagram of a system to make and track phone connections according to one embodiment.

FIG. 10 shows a diagram of a system to make and track phone connections according to one embodiment. In FIG. 10, a database (251) may contain the phone numbers of target phone A (261), target phone B (263), . . . , target phone X (269), etc. Typically, the target phones belong to the institutions, businesses, individuals, etc., which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 10, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 11:
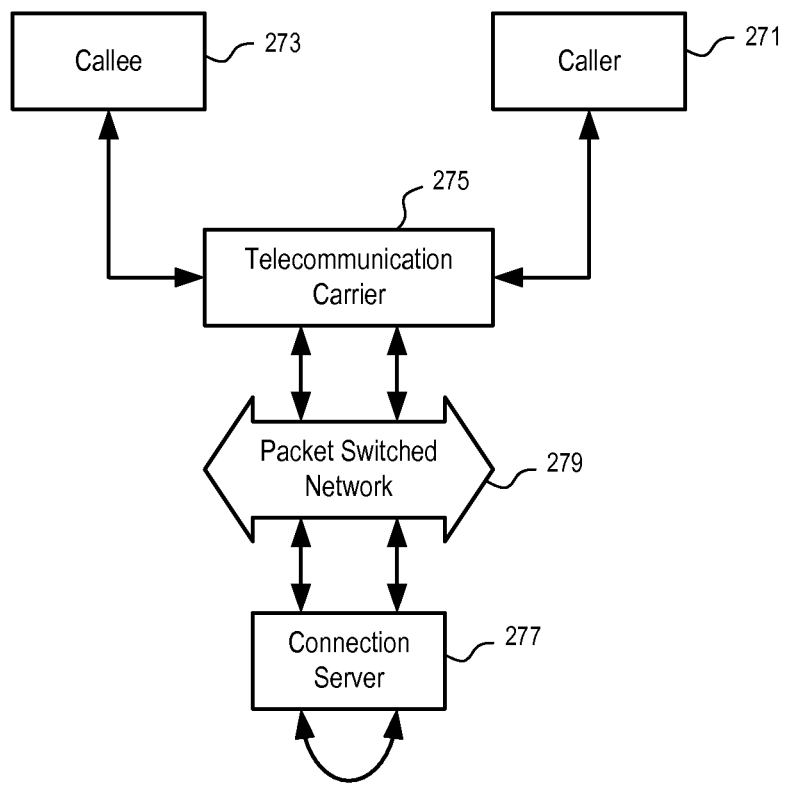
FIG. 11 shows a system including a connection server configured on a packet switched network according to one embodiment.

In one embodiment, a connection provider uses a connection server configured on a packet switched network to provide telephonic connections between callers (e.g., customers) and callees (e.g., advertisers), as illustrated in FIG. 11. In FIG. 11, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection server (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 11, the telephonic connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 12:
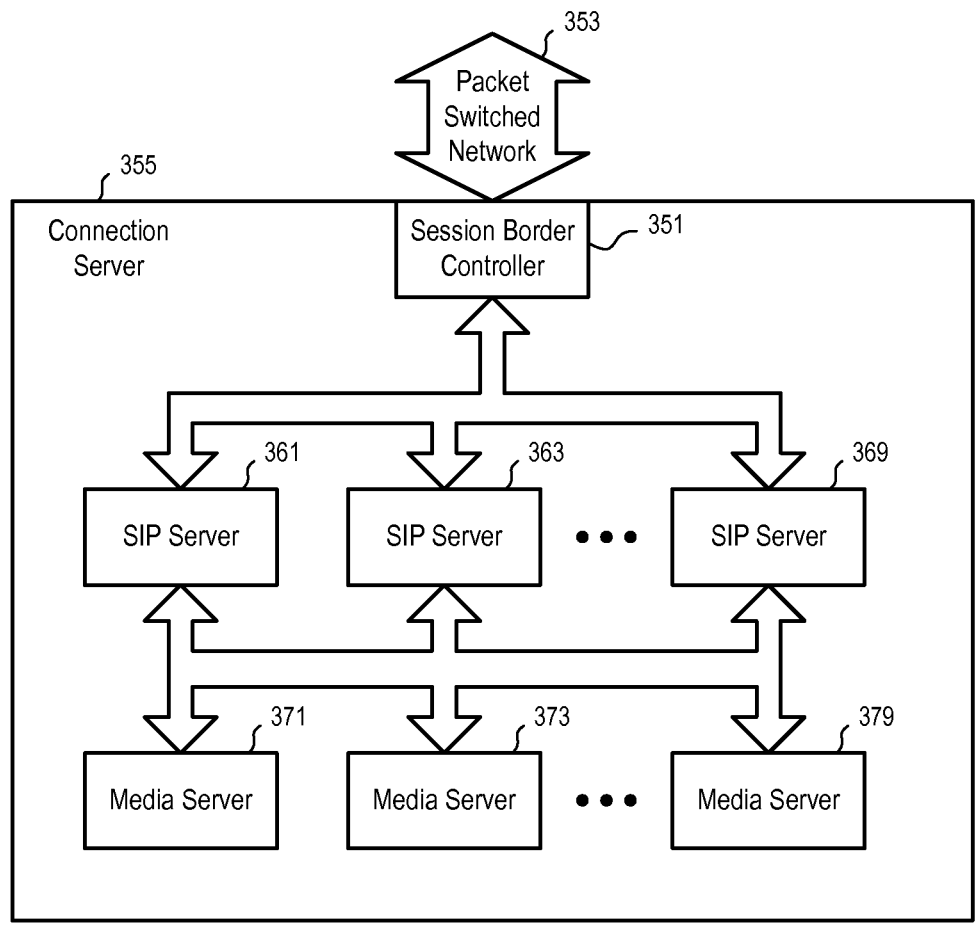
FIG. 12 shows a connection server according to one embodiment.

FIG. 12 shows a connection server according to one embodiment. In FIG. 12, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 12, a set of SIP servers (e.g., 361, 363, ..., 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 11 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 13:
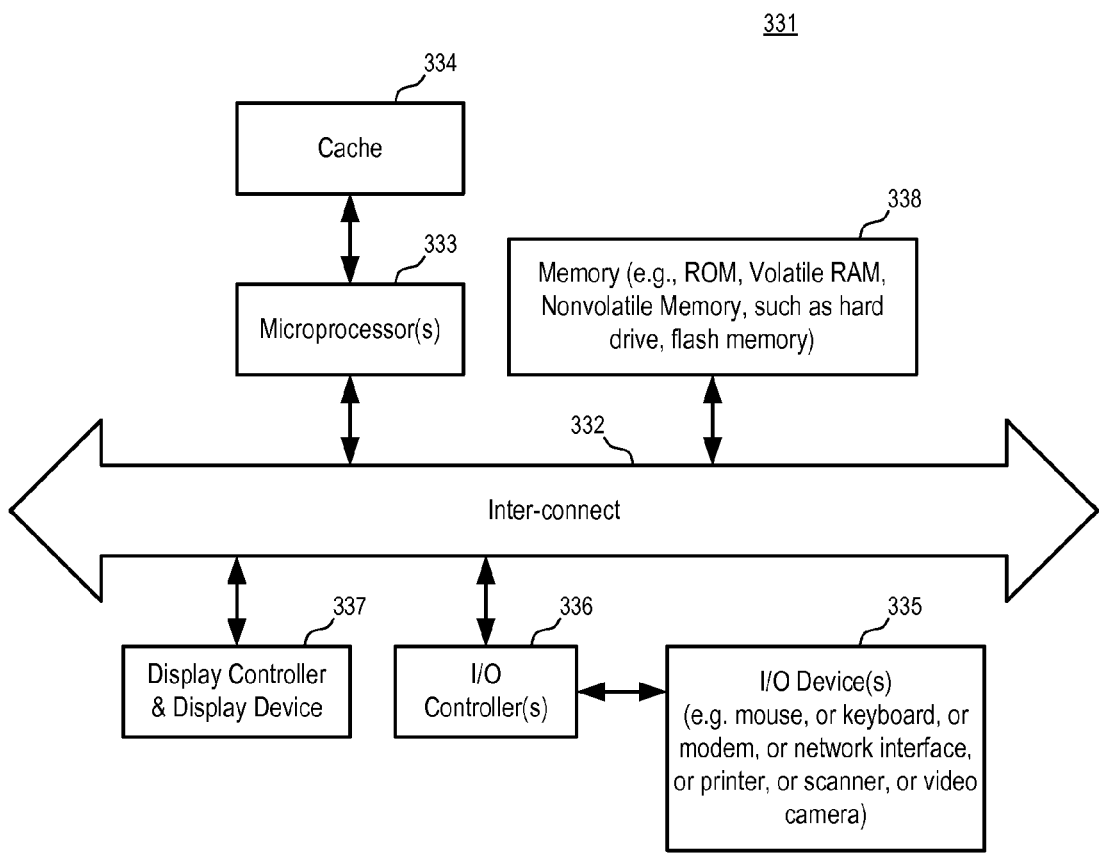
FIG. 13 shows a block diagram example of a data processing system which may be used in various embodiments.

FIG. 13 shows a block diagram example of a data processing system which may be used in various embodiments. While FIG. 13 illustrates various components of a computer system, it is not intended to represent any particular architecture or manner of interconnecting the components. Other systems that have fewer or more components may also be used.

In FIG. 13, the communication device (331) is a form of a data processing system. The system (331) includes an inter-connect (332) (e.g., bus and system core logic), which interconnects a microprocessor(s) (333) and memory (338). The microprocessor (333) is coupled to cache memory (334) in the example of FIG. 13.

The inter-connect (332) interconnects the microprocessor(s) (333) and the memory (338) together and also interconnects them to a display controller and display device (337) and to peripheral devices such as input/output (I/O) devices (335) through an input/output controller(s) (336). Typical I/O devices include mice, keyboards, modems, network interfaces, printers, scanners, video cameras and other devices which are well known in the art.

The inter-connect (332) may include one or more buses connected to one another through various bridges, controllers and/or adapters. In one embodiment the I/O controller (336) includes a USB (Universal Serial Bus) adapter for controlling USB peripherals, and/or an IEEE-1394 bus adapter for controlling IEEE-1394 peripherals.

The memory (338) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 13 is used as one of the communication server(s), virtual reality server(s), connection server(s), database server(s), media server(s), controller(s), router(s), gateway(s), etc.

In some embodiments, one or more servers of the system can be replaced with the service of a peer to peer network of a plurality of data processing systems, or a network of distributed computing system. The peer to peer network, or a distributed computing system, can be collectively viewed as a server data processing system.

In one embodiment, a web server or a file server is used to provide computer instructions for implement the methods to user terminals. When the computer instructions are executed on the user terminals, the user terminals perform methods according various embodiments of the disclosure. In another embodiment, a peer to peer network is used in providing to user terminals the computer instructions for implement the methods.

A user terminal as a client system can be a data processing system similar to the system of FIG. 13. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

Figure 14:
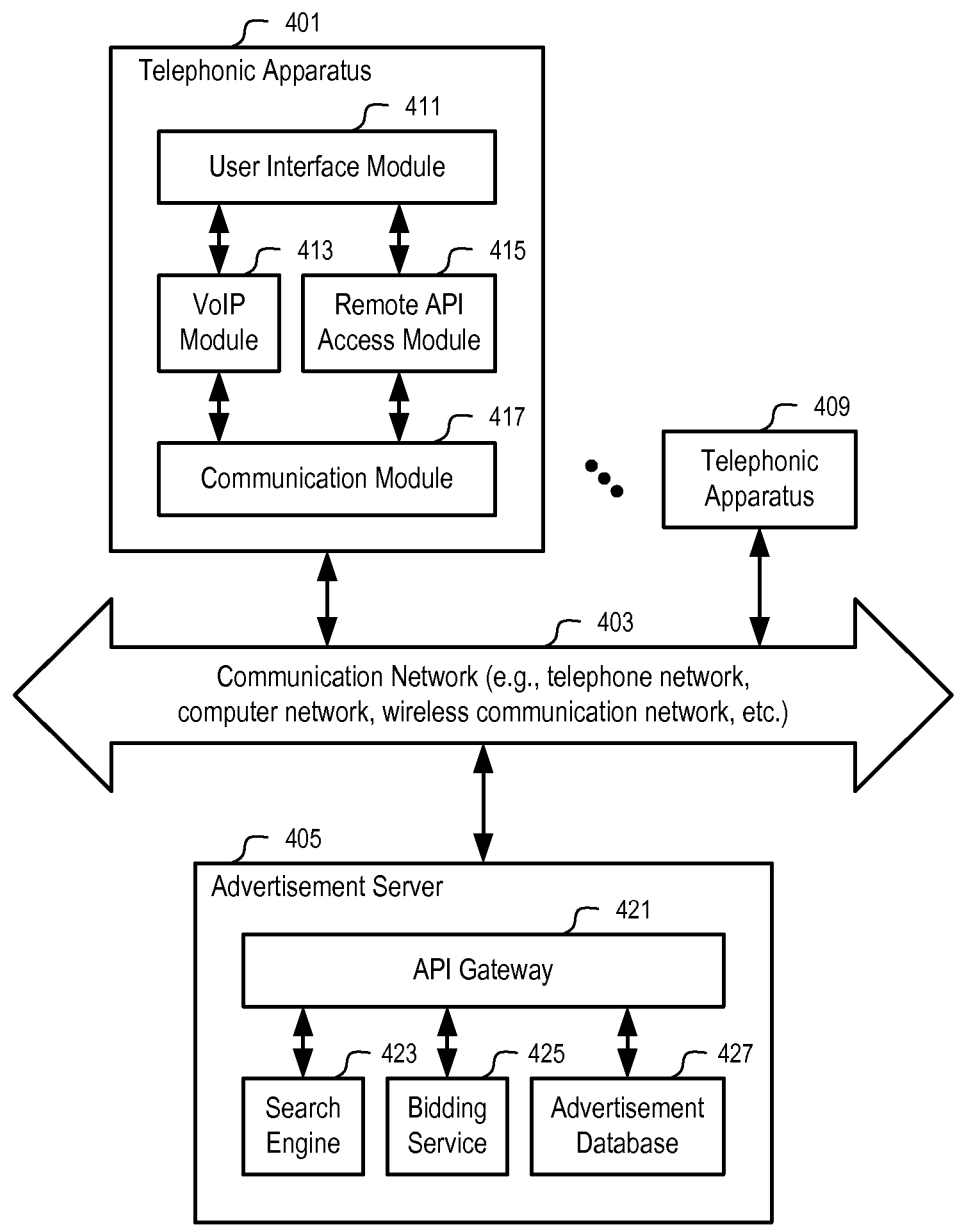
FIG. 14 illustrates a system to display and manage advertisements according to one embodiment.

FIG. 14 illustrates a system to display and manage advertisements according to one embodiment. In FIG. 14, a telephonic apparatus (401) is capable to place and/or receive a VoIP call through the connection to the communication network (403). The communication network may include a telephone network (e.g., for providing an Internet connection), a computer network, a wireless communication network, etc.

In one embodiment, the telephonic apparatus (401) includes a VoIP module (413) coupled with a user interface module (411) and a communication module (417) to provide the VoIP telephonic function. In one embodiment, the telephonic apparatus (401) can operate to make VoIP calls to other telephonic apparatuses (e.g., 409) without activating the remote API access module (415) and communicating with the advertisement server (405).

In one embodiment, the telephonic apparatus (401) further includes a remote API access module (415) coupled with the user interface module (411) and the communication module (417) to provide access to advertisements. Thus, the access to the advertisements, such as yellow page information and telephonic based service listings, can be conveniently obtained from the user interface of the telephonic apparatus (401).

In one embodiment, the advertisement server (405) provides services access to a search engine (423), a bidding service (425) and an advertisement database (427) through an API gateway (421). The search engine (423) can perform a search on the advertisement database (427) according to user specified search terms. The bidding service (425) can provide competitive bidding information on similar advertisements/ service listings.

The API gateway (421) may be implemented using a hypertext transfer protocol (HTTP) server, or a communication server that uses other types of communication protocols. The data may be transferred in a Hypertext Markup Language (HTML) format, or an Extensible Markup Language (XML) format, or a custom designed format.

In one embodiment, the telephonic apparatus (401) uses the remote API access module (415) to submit search requests to the search engine (423) over the communication network (403), retrieve the search results from the API gateway (421), and display the search results in the user interface of the telephonic apparatus.

In one embodiment, the telephonic apparatus (401) displays the advertisements but not the telephonic contact information. Telephonic contact information is when the user requests to call the advertiser of the advertisement.

In one embodiment, no telephonic contact information is transmitted to the telephonic apparatus with the advertisements. Instead, the telephonic contact information for calling the advertiser is retrieved from the advertisement server in a just-in-time fashion after the user requests to call the advertiser who is identified by an identifier embedded in the advertisement or the corresponding identification of the advertisement.

Alternatively, no telephonic contact information is transmitted to the telephonic apparatus for the advertisements. Instead, the user requests to call the advertiser, the telephonic contact information of the telephonic apparatus is transmitted to the API gateway (421) together with an identifier of the advertiser or an identifier of the advertisement. The advertisement server (405) then arranges a call back to the telephonic apparatus to connect the telephonic apparatus (401) to a telephonic apparatus of the advertiser.

It is understood that various modules of the telephonic apparatus can be implemented in hardware, software, or a combination of hardware and software. For example, the VoIP module may be implemented partially using a software program which is to be executed in a microprocessor to assemble/dissemble data packets, to perform data compression/decompression, etc. Alternatively, these functions can be implemented using an Application-Specific Integrated Circuit (ASIC) or a Field-Programmable Gate Array (FPGA).

Figure 15:
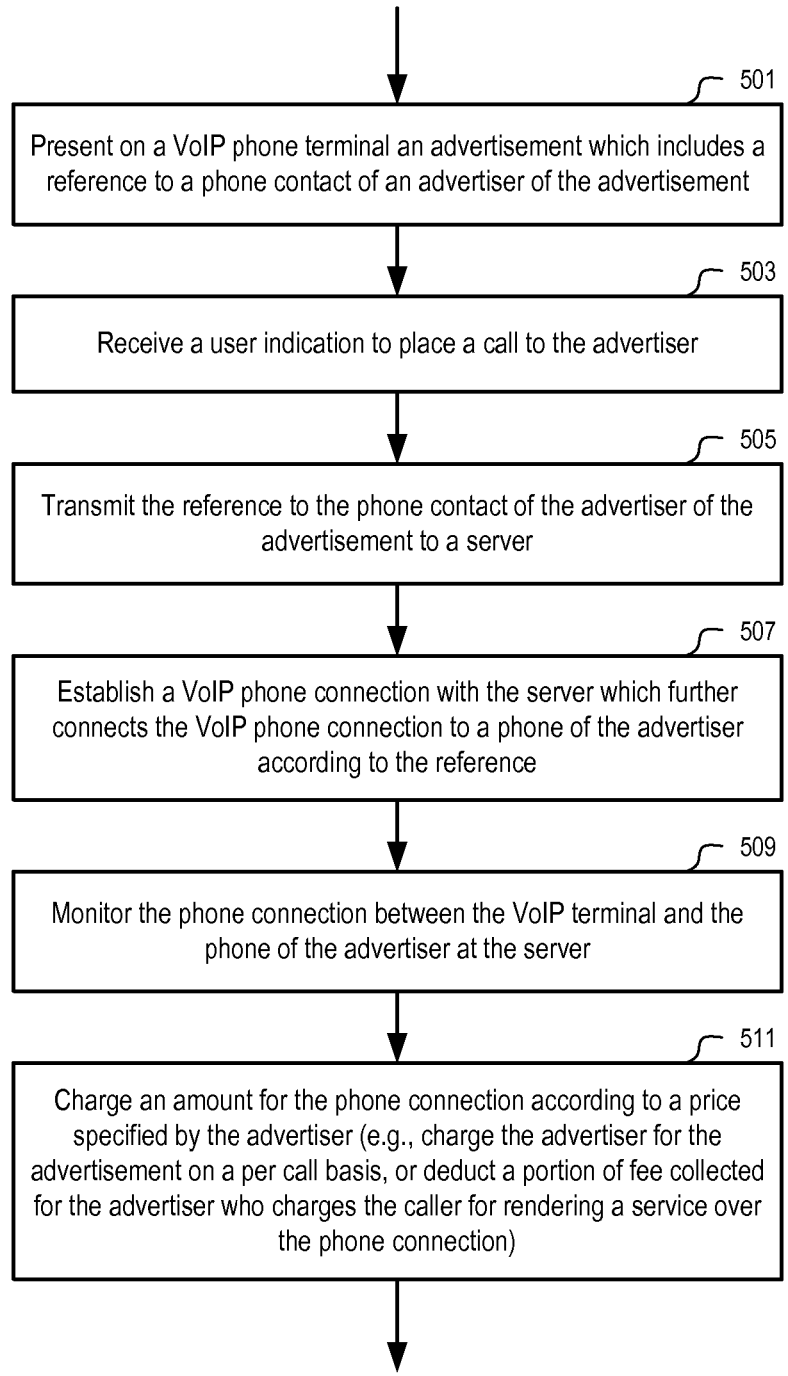
FIG. 15 illustrates a method to display advertisements according to one embodiment.

FIG. 15 illustrates a method to display advertisements according to one embodiment. In FIG. 15, an advertisement is presented (501) on a VoIP phone terminal (e.g., in response to one or more search terms submitted from the phone terminal, such as a search term for service category and another search term for a geographic area of the services). In one embodiment, the advertisement includes a reference to a phone contact of an advertiser of the advertisement. The reference may be a direct phone number of the advertiser, or an indirect phone number of a routing server which is assigned to the advertiser, or a VoIP application user ID of the advertiser, or an indirect VoIP application user ID of a routing server which is assigned to the advertiser, or an identifier of the advertiser, or an identifier of the advertisement, etc.

After a user indication to place a call to the advertiser is received (503), the reference to the phone contact of the advertiser of the advertisement is transmitted (505) to a server; and a VoIP phone connection with the server is established (507). The VoIP phone connection between the server and the VoIP terminal may be initiated by the VoIP terminal or the server. The reference to the phone contact may be transmitted through initiate the VoIP phone connection or through a separate data transmission from the VoIP terminal to the server. The server further connects the VoIP phone connection to a phone of the advertiser according to the reference.

In one embodiment, the phone connection between the VoIP terminal and the phone of the advertiser is monitored (509) at the server.

In one embodiment, an amount for the phone connection according to a price specified by the advertiser is charged (511). For example, the advertiser is charged for the advertisement on a per call basis; or a portion of fee collected for the advertiser who charges the caller for rendering a service over the phone connection is deducted as the fee to provide the service to make the phone connection.

Figure 16:
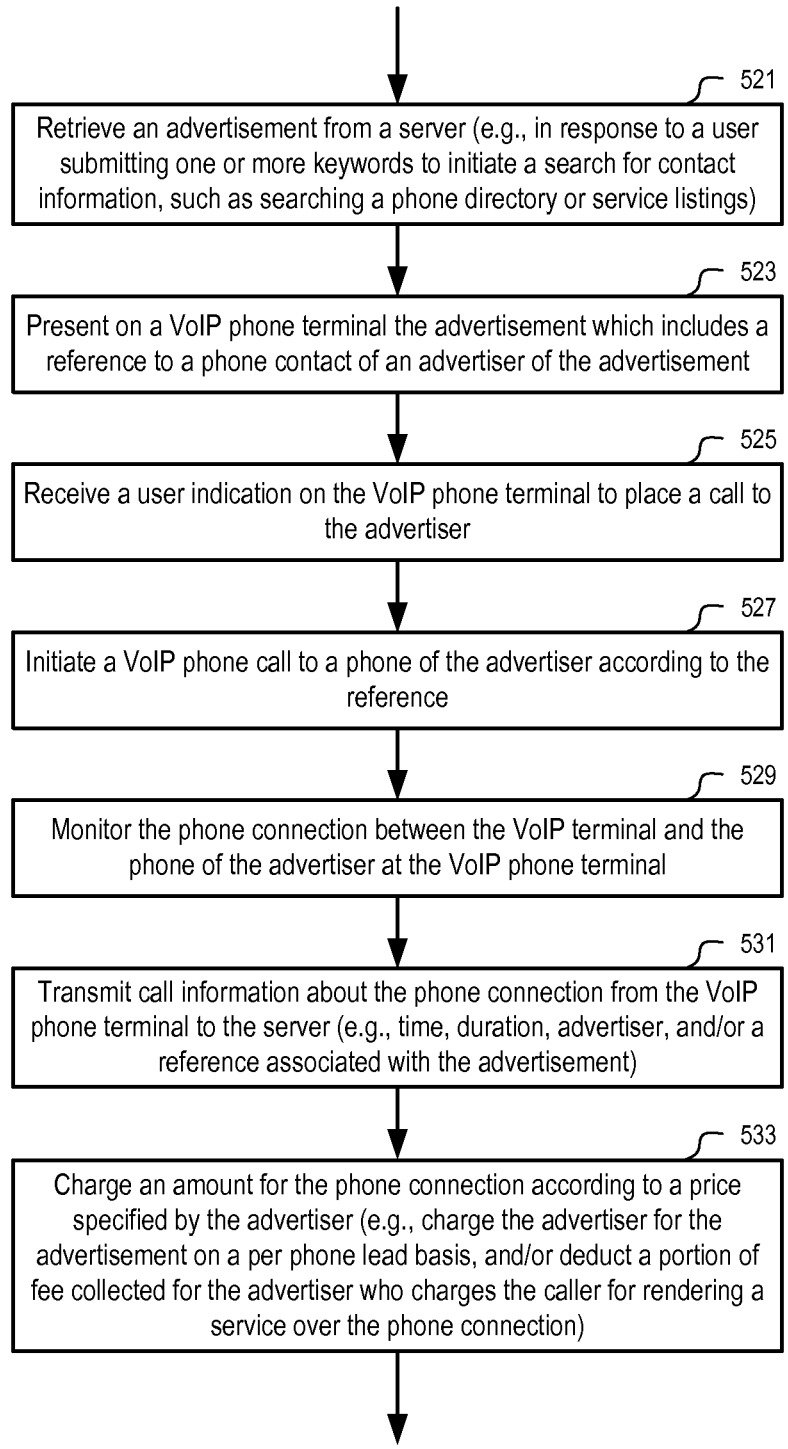
FIG. 16 illustrates a further method to display advertisements according to one embodiment.

FIG. 16 illustrates a further method to display advertisements according to one embodiment. In FIG. 16, an advertisement is retrieved (521) from a server (e.g., in response to a user submitting one or more keywords to initiate a search for contact information, such as searching a phone directory or service listings) and presented (523) on a VoIP phone terminal. The advertisement includes a reference to a phone contact of an advertiser of the advertisement, such as a direct phone number of the advertiser, or an indirect phone number of a routing server which is assigned to the advertiser, or a VoIP application user ID of the advertiser, or an indirect VoIP application user ID of a routing server which is assigned to the advertiser, or an identifier of the advertiser, or an identifier of the advertisement, etc.

After a user indication is received (525) on the VoIP phone terminal to place a call to the advertiser, a VoIP phone call is initiated (527) to a phone of the advertiser according to the reference.

In one embodiment, the phone connection between the VoIP terminal and the phone of the advertiser is monitored (529) at the VoIP phone terminal.

The call information about the phone connection is transmitted (531) from the VoIP phone terminal to the server. The call information may include time, duration, advertiser, and/or a reference associated with the advertisement, etc. Based on the call information about the phone connection, an amount for the phone connection is charged (533) according to a price specified by the advertiser (e.g., charge the advertiser for the advertisement on a per phone lead basis, and/or deduct a portion of fee collected for the advertiser who charges the caller for rendering a service over the phone connection).

Figure 17:
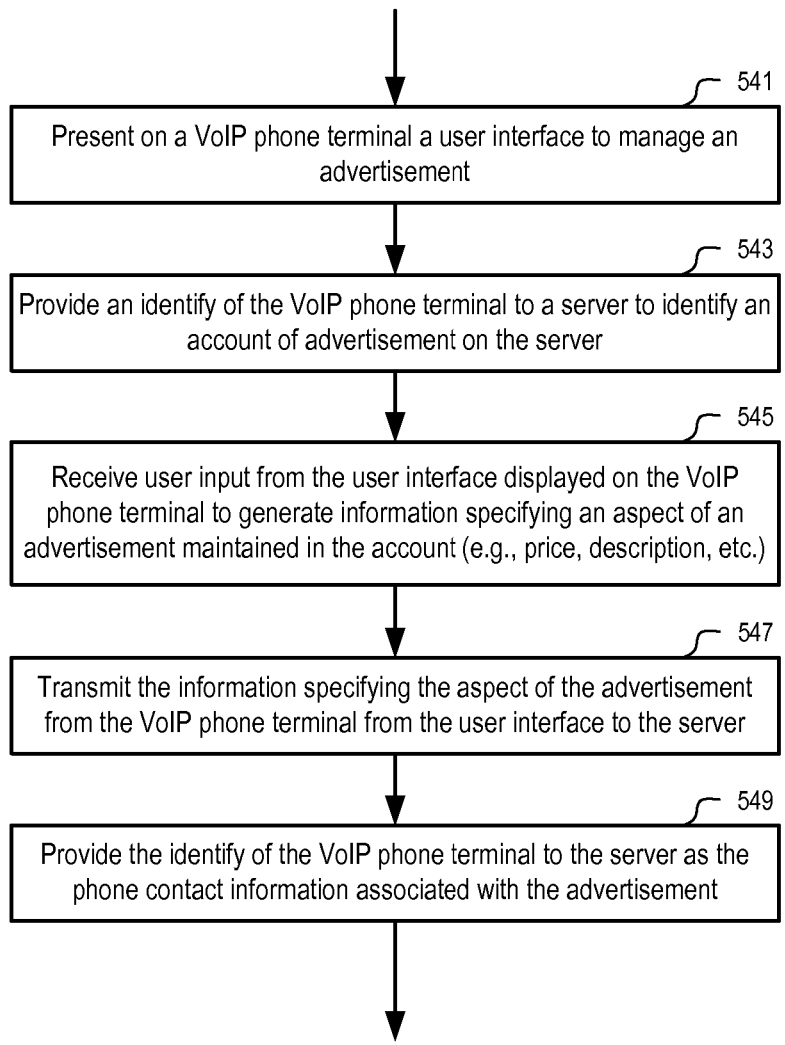
FIG. 17 shows a method to manage an advertisement according to one embodiment.

FIG. 17 shows a method to manage an advertisement according to one embodiment. In FIG. 17, a user interface is presented (541) on a VoIP phone terminal to manage an advertisement. An identify of the VoIP phone terminal is provide (543) to a server to identify an account of advertisement on the server.

After user input from the user interface displayed on the VoIP phone terminal is received (545) to generate information specifying an aspect of an advertisement maintained in the account (e.g., price, description, etc.), the information specifying the aspect of the advertisement is transmitted (547) from the VoIP phone terminal from the user interface to the server.

In one embodiment, the identify of the VoIP phone terminal (e.g., a phone number of the VoIP phone terminal or a user ID of the VoIP Phone terminal) is provided (549) (e.g., automatically) to the server as the phone contact information associated with the advertisement.

Figure 18:
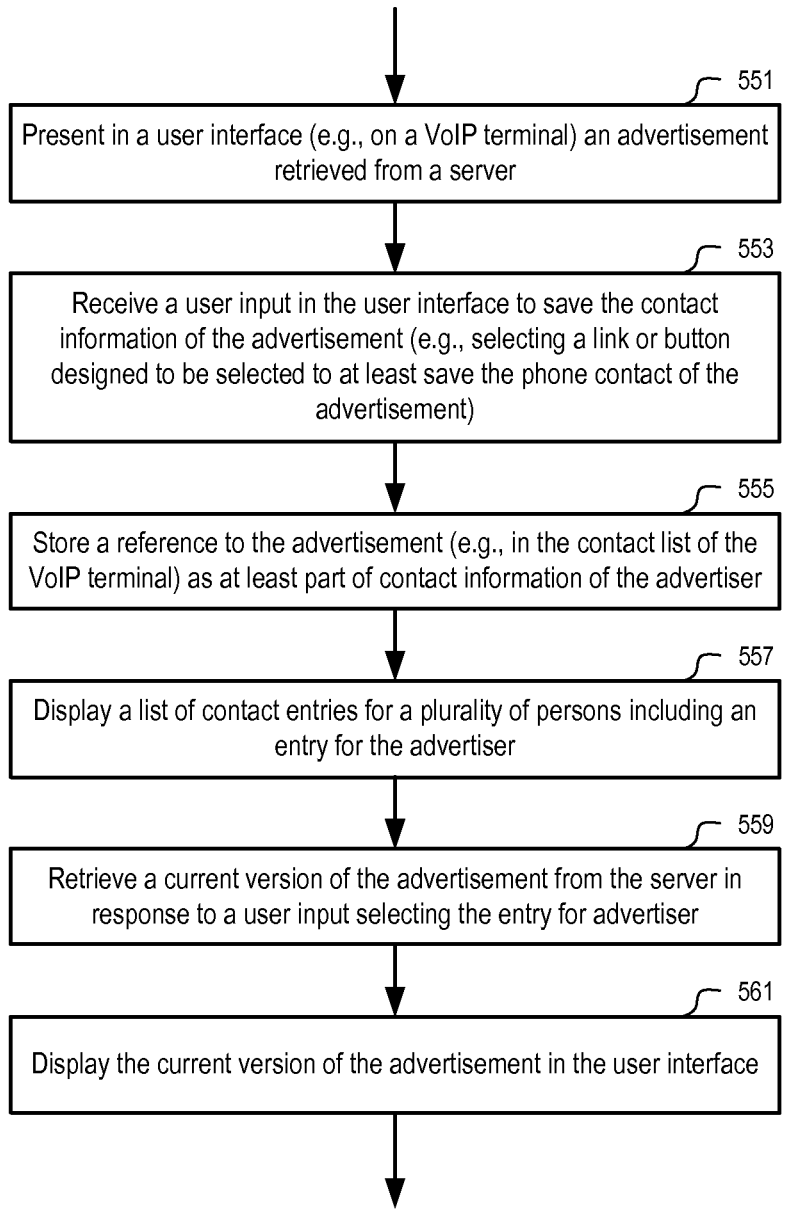
FIG. 18 shows a method to manage telephonic contact information according to one embodiment.

FIG. 18 shows a method to manage telephonic contact information according to one embodiment. In FIG. 18, an advertisement retrieved from a server is presented (551) in a user interface (e.g., on a VoIP terminal). After a user input is received in the user interface to save the contact information of the advertisement (e.g., selecting a link or button designed to be selected to at least save the phone contact of the advertisement), a reference to the advertisement is stored (e.g., in the contact list of the VoIP terminal) as at least part of contact information of the advertiser.

In one embodiment, a list of contact entries can be displayed (557) for a plurality of persons including an entry for the advertiser. In response to a user input selecting the entry for advertiser, a current version of the advertisement is retrieved (559) from the server and displayed (561) in the user interface.

In one embodiment, the actual phone contact information of the advertiser is not displayed, stored, or even transmitted to the VoIP terminal. The current version of the advertisement provides the means for the VoIP terminal to start the telephonic connection, as in certain embodiments described above.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the API for the management of Pay Per Call advertisements includes a number of methods which an application may invoke to manage the advertisements/listings (e.g., through a web service). In one embodiment, a web service using Simple Object Access Protocol (SOAP), Representational State Transfer (REST), remote procedure call (RPC) via HyperText Transfer Protocol (HTTP) or binary access is used to invoke one or more of the methods of the API. Alternatively, a custom designed communication protocol can also be used.

Figure 19:
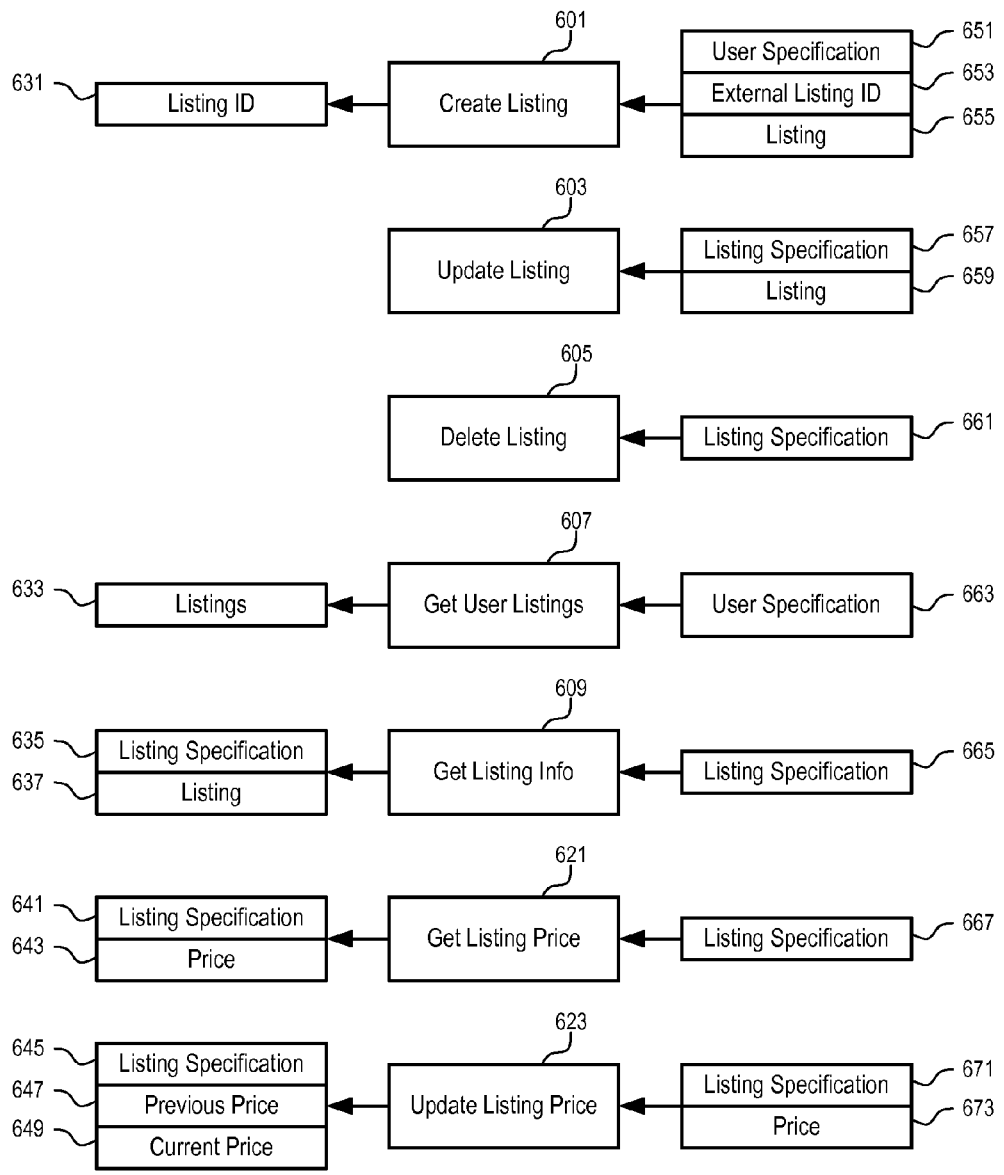
FIGS. 19-20 illustrate application programming interfaces according to one embodiment.
Figure 20:
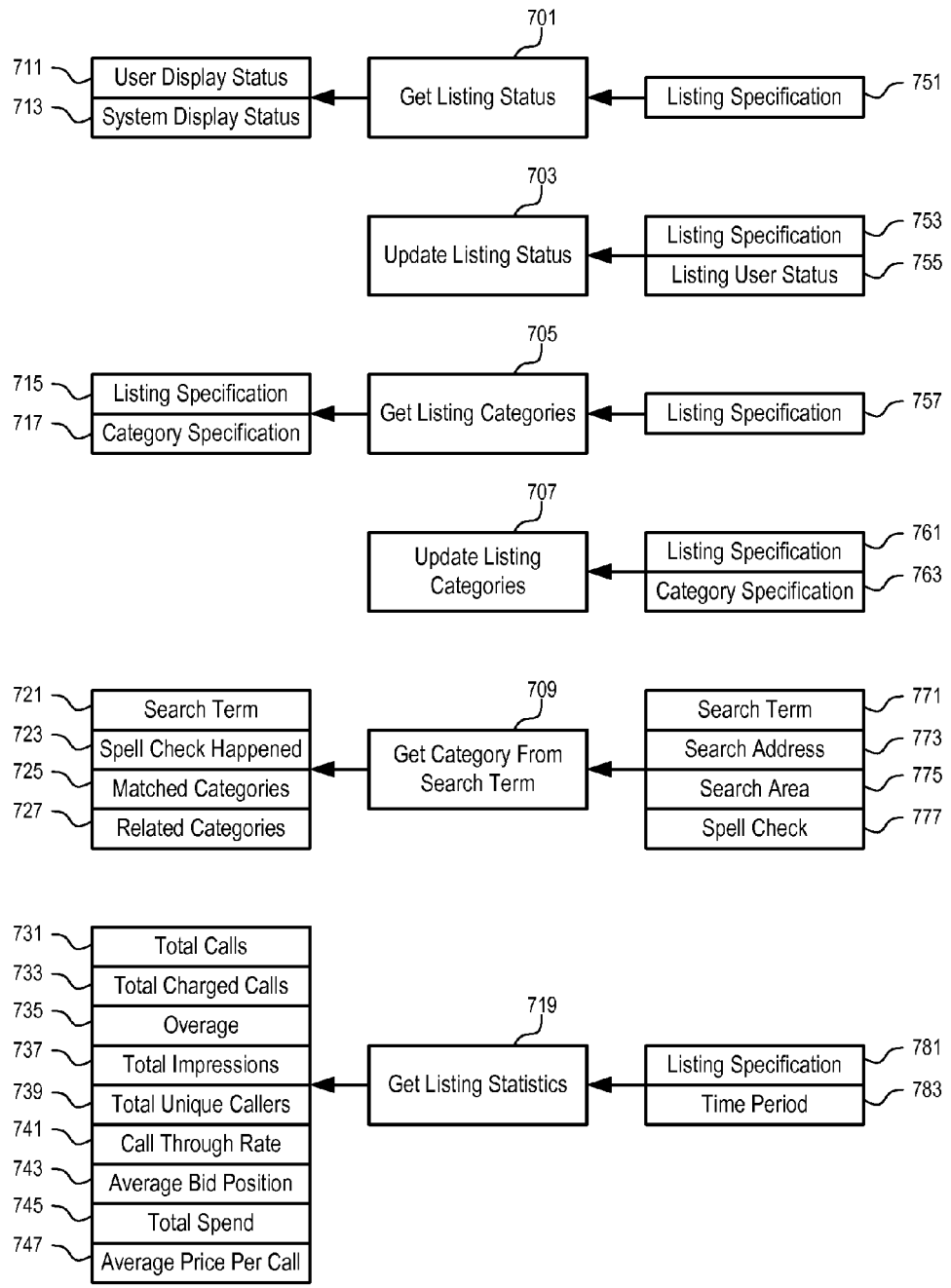
Figure 21:
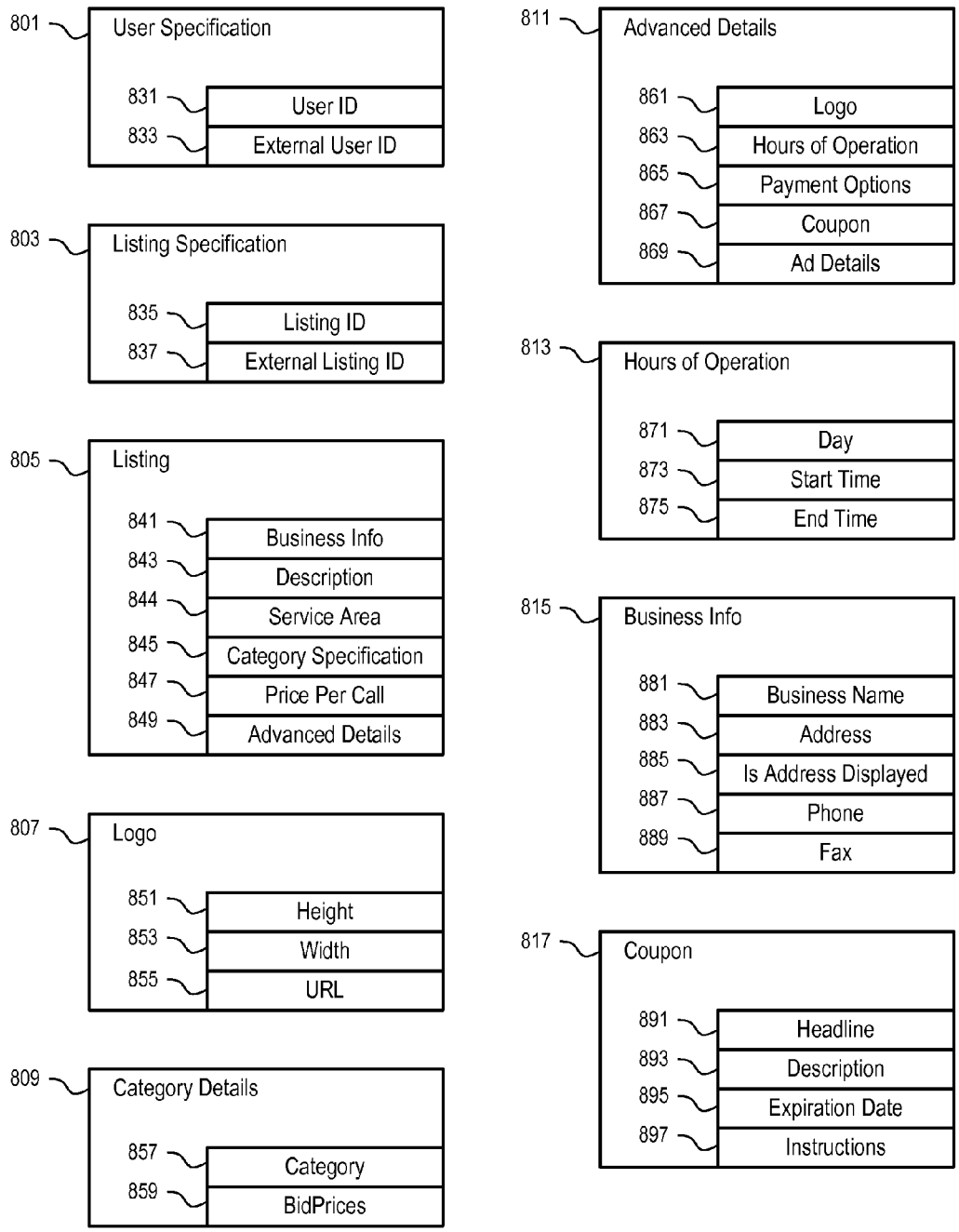
FIG. 21 illustrates data objects for application programming interfaces according to one embodiment.

FIGS. 19-20 illustrate application programming interfaces according to one embodiment. FIG. 21 illustrates data objects for application programming interfaces according to one embodiment.

A method, for example, CreateListing (e.g., Create Listing 601) can be used to create a new listing when the user provides the detailed information about the listing (e.g., Listing 655) together with the identification of the advertiser (e.g., User Specification 651). After the listing is created, the server system provides the calling application with an internal listing identifier (e.g., Listing ID 631) generated by the system. The internal listing identifier can be subsequently used to identify this listing. Optionally, the user may further include an external identifier (e.g., External Listing ID 653) to identify the listing when making the request to create the listing.

In one embodiment, the external identifier and/or the internal listing identifier of the listing can be subsequently used to identify the listing. For example, an object (e.g., Listing Specification 803) for the identification of a listing may include a field for specifying the internal listing identifier (e.g., Listing ID 835) and a field for specifying the external identifier (e.g., External Listing ID 837).

In one embodiment, an object used to define the specification of an advertisement (listing) (e.g., 805) includes a number of fields, such as Business Info (841) specifying the contact information of the advertiser, Description (843) specifying a short advertisement message (e.g., less than 80 characters), Service Area (844) of the product and/or service advertised by the listing, Category Specification (845) specifying one or more categories of services and/or products of the advertisement, Price Per Call (847) specifying the bids for the communication leads (e.g., telephone calls) generated by the advertisement, and Advanced Details (849).

In one embodiment, an object Business Info (815) includes a number of fields, such as Business Name (881), address (883) of the business/advertiser, phone number (887) of the business/advertiser, and fax (889) of the business/advertiser. In one embodiment, a phone number or a fax number may include the country code, area code, and/or an extension code. In one embodiment, a field (e.g., Is Address Displayed 885) allows the user to indicate whether or not the specified address (883) is to be displayed with the advertisement.

In one embodiment, an advertisement can have Advanced Details (811), such as Logo (861), Hours of Operation (863), Payment Options (865) (e.g., cash, Visa, MasterCard, American Express, discover, debit, personal check, PayPal, etc), Coupon (867), and Ad Details (869) which describes for further details of the advertisement.

For example, a Logo (807) can be specified by a Universal Resource Locator (URL) (855) which points to a downloadable image of the logo, and the dimensions of the logo, such as Height (851) and Width (853).

For example, an object for Hours of Operation (813) specifies the day of the week (e.g., Day 871), the start time (e.g., 873) and the end time (e.g., 875) of the specified day. A number of objects for Hours of Operation (813) can be used to specify a schedule during which the advertiser is to be in operation (e.g., to take calls generated from the advertisement).

In one embodiment, an electronic coupon can be attached to an advertisement. A coupon (817) may include Headline (891), Description (893) specifying the offer of the coupon, Expiration Date (895) of the coupon, and Instructions (897) for the redemption of the coupon.

A method, for example, UpdateListing (e.g., Update Listing 603) can be used to update an existing listing according to the detailed information provided (e.g., provided via object Listing 659). The listing may be identified using the internal identifier generated by the system when the listing is created, and/or the external identifier provided to the system when the creation of the listing is requested. In one embodiment, an object (e.g., Listing Specification 657) is used to identify an listing for access; and such an object (e.g., 803) may include the internal listing identifier (e.g., Listing ID 835) that is returned by the system during the creating of the listing and the external listing identifier (e.g., External Listing ID 837) that is specified by the user during the creating of the listing.

A method, for example, DeleteListing (e.g., Delete Listing 605) can be used to delete an existing listing. The listing can be identified using the internal identifier generated by the system when the listing is created, or the external identifier provided to the system when the creation of the listing is requested (e.g., using Listing Specification 661). In one embodiment, a number of listings can be deleted in a batch mode when a list of objects specifying that listings is provided.

A method, for example, GetUserListings (e.g., Get User Listings 607) can be used to get the listings associated with a specified user (e.g., via an object User Specification 663). In one embodiment, the user may be specified using an internal user ID that is assigned to the user during the creation of the user in the system, and/or be specified using an external user ID that is provided by the user when the creation of the user in the system is requested. In one embodiment, an object (801) is used to represent a user; and such an object may include the internal user ID (e.g., User ID 831) and/or the external user ID (e.g., External User ID 833). The internal user ID is created by the system when an account for the user is create using a graphical user interface (e.g., a web based user interface) or an application programming interface. The external user ID is provided by the user when the account is created for the user. In one embodiment, a list of objects (e.g., 633) specifying the listings of the user is retrieved when the method GetUserListings (e.g., Get User Listings 607) is invoked.

A method, for example, GetListingInfo (e.g., Get Listing Info 609) can be used to retrieve the details of an existing listing. The listing can be specified using the internal and/or external identifiers (e.g., via Listing Specification 665). In one embodiment, a number of listings can be retrieved in a batch mode. In response to receiving a list of objects identifying the listings, the system returns a list of objects, each containing the identification of one listing (e.g., Listing Specification 635) and the details of the listing (e.g., Listing 637).

A method, for example, GetListingPricePerCall (e.g., Get Listing Price 621) can be used to retrieve the current price per call (bid) stored in the system for the specified listing (e.g., specified using the internal and/or external identifier via Listing Specification 667). In one embodiment, the prices for a number of listings can be retrieved in a batch mode. In response to receiving a list of objects identifying the listings, the system returns a list of objects, each containing the identification of one listing (e.g., Listing Specification 641) and its price (e.g., Price 643).

A method, for example, UpdateListingPricePerCall (e.g., Update Listing Price 623) can be used to update/submit the price per call bid in the system for the specified listing (e.g., specified using the internal and/or external identifier via Listing Specification 671). In one embodiment, the price for a number of listings can be updated in a batch mode. In response to receiving a list of objects identifying the listings (e.g., Listing Specification 671) and the price (e.g., Price 673), the system returns a list of objects, each containing the identification of one listing (e.g., Listing Specification 645), its price before the update (e.g., Previous Price 647) and its updated price (e.g., Current Price 649).

A method, for example, GetListingStatus (e.g., Get Listing Status 701) can be used to retrieve the status information about a specified listing. In one embodiment, the user may specify the status of a listing as active or paused. When active, the listing is available for selection for presentation to the consumers (e.g., users of a search engine, etc.). When paused, the listing will not be presented even if there is a matching opportunity for presenting the listing. In one embodiment, the system may specify the status of a listing as Active or Paused. In one embodiment, the system may further specify the reason for the Paused status, such as Invoice Approval Pending, Invoice Not Approved, Not Accepted, Budget Limit Reached, Monthly Limit Reached, Credit Card Failed, Credit Card Expired, Credit Limit Reached, Low Funds, No Payment Info, Pending Acceptance, No Payment Plan, etc. The method can be used to retrieve such status information about a listing. In one embodiment, the status information for a number of listings can be retrieved in a batch mode. In response to receiving a list of objects identifying the listings (e.g., Listing Specification 751), the system returns a list of objects, each containing the user specified status (e.g., User Display Status 711) and the system specified status (e.g., System Display Status 713) for one listing.

A method, for example, UpdateListingStatus (e.g., Update Listing Status 703) can be used to update/submit the user defined status of a specified listing. For example, the method can be used to receive user input that indicates whether the status of the listing should be active or paused. In one embodiment, the status of a number of listings can be specified in a batch mode. In response to receiving a list of objects identifying the listings (e.g., Listing Specification 753) and the user specified status (e.g., Listing User Status 755), the system updates the status of the listings accordingly.

A method, for example, GetListingCategories (e.g., Get Listing Categories 705) can be used to retrieve from the system the current categories under which a specified listing is listed. In general, a listing can be listed in one or more different categories. When a search matches any of the specified categories, the listing may be selected for presentation. In one embodiment, the category information for a number of listings can be retrieved in a batch mode. In response to receiving a list of objects identifying the listings (e.g., Listing Specification 757), the system returns a list of objects, each containing the identification of one listing (e.g., Listing Specification 715) and its category information (e.g., Category Specification 717) that contains one or more categories under which the listing is listed.

A method, for example, UpdateListingCategories (e.g., Update Listing Categories 707) can be used to update/submit to the system the categories under which a specified listing is listed. In one embodiment, the listing can be specified using an object (e.g., Listing Specification 761) and category information of the listing can be specified using another object (e.g., Category Specification 763) which contains one or more categories under which the listing is listed.

A method, for example, GetCategoryFromSearchTerm (e.g., Get Category From Search Term 709) can be used to retrieve the categories of listings that match and/or are related to the specified key words of a search. For example, the API may accept a string of characters as one or more key words (e.g., Search Term 771).

A method, for example, can be used to search categories of listings. The search may be related to a specific address (e.g., a street address specified via object Search Address 773). The search may be limited to the categories of listings that have a service area within a specified geographic area, such as within the city region of the specified address, within the state or nation of the specified address, or a number of units (e.g., miles, street blocks, etc) within the radius of the specified address, etc. In one embodiment, the search may specify that the requirement for the search area is unknown, in which case the server will attempt to determine a geographic area for the search. In one embodiment, the search area is specified via an object (Search Area 775).

In one embodiment, in the request for key word based search of categories, the API further receives an indication (e.g., Spell Check 777) of whether or not spell checking is to be performed on the string of search term. In one embodiment, when such a method is executed to retrieve categories based on the search terms, the system can update the search term to indicate the corrected spelling. In one embodiment, the spelling-corrected search term is provided in an object (e.g., Search Term 721). In one embodiment, an indication (e.g., Spell Check Happened 723) of whether a correction has been made to the search term is also provided.

In one embodiment, the categories that match the search terms are returned to the calling application after the search (e.g., via an object for Matched Categories 725). The search result may further include a number of top price bids for the listings in the corresponding categories (e.g., the top 5 prices). In one embodiment, an object for describing a matched category (e.g., Category Details 809) includes the category (e.g., 857) and a number of top price bids (e.g., BidPrices 859) in the category. In one embodiment, the related categories that may fit the search terms are also suggested (e.g., via an object for Related Categories 727).

A method, for example, GetListingStatistics (e.g., Get Listing Statistics 719) can be used to retrieve the statistics related to a given listing (e.g., specified using an object Listing Specification 284) during a specified time period (e.g., Time Period 286). Examples of time periods include today, yesterday, week to date, month to date, quarter to date, year to date, etc. In one embodiment, the statistics includes total number of calls (e.g., Total Calls 281), total number of charged calls (e.g., Total Charged Calls 733), overage (e.g., 735, the number of minutes over a predetermined "free connection time" allowed per call, beyond which the communication time may be charged at a predetermined per minute rate), total impressions (e.g., 737, the number of times an advertisement is viewed, which can be estimated based on the number of times the advertisement is being requested or can be tracked based on the number of times the advertisement is loaded into browsers for presentation), total number of unique callers (e.g., Total Unique Callers 739), call through rate (e.g., 741), average bid position (e.g., 743), total amount spent on the listing for advertisement (e.g., Total Spend 745), average price per call (e.g., 747), etc.

In general, more or less methods may be implemented for a listing management API.

In one embodiment, the API is provided through a web service (e.g., using a web server). Alternatively, other types of services (servers), such as a server with a custom designed communication protocol can also be used.

Figure 22:
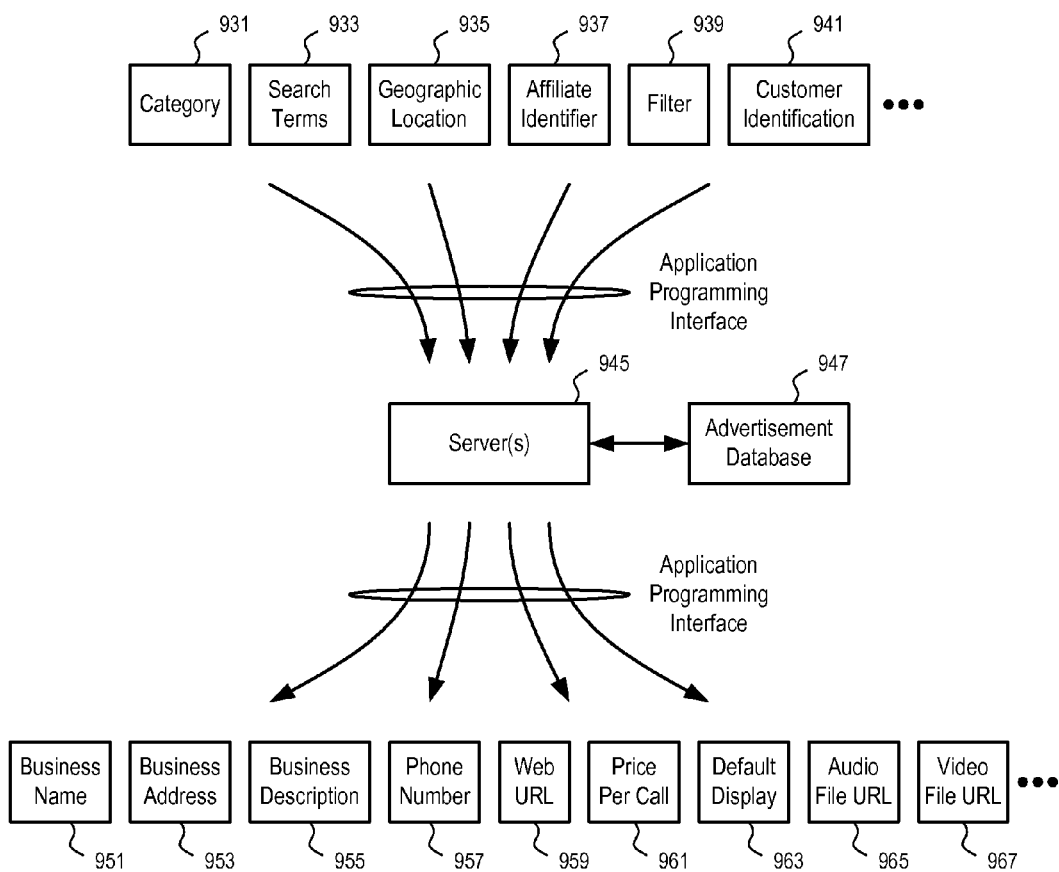
FIG. 22 illustrates an application programming interface to provide advertisements according to one embodiment.

FIG. 22 illustrates an application programming interface to provide advertisements according to one embodiment. In FIG. 22, an application programming interface is provided to facilitate the development of client applications (not shown in FIG. 22). Through the application programming interface, the client applications can access the server(s) (945) to query the advertisement database (947). In one embodiment, the server(s) (945) includes web service servers, listing (advertisement) servers, and reference allocation servers. The web service servers are used to receive request from client applications via web and to provide listing information via web. For example, the advertisement information (e.g., 951-867, . . . ) can be provided via an XML data document that is generated in response to the received web request. The listing (advertisement) servers are used to determine or identify the requested listing information in response to the requests that are received via the web service servers; and the reference allocation servers are used to allocate the communication references (e.g., assigned telephone numbers or click-to-call references) for the listing information that is to be provided via the web as a response. In one embodiment, the advertisement database (947) is stored on one or more database servers and cached in the memory of the listing (advertisement) servers. The listing (advertisement) servers communicate with the database servers to obtain the current advertisement data. The advertisement database (947) may be implemented using a non-volatile file system, a volatile random access memory system, or a combination of non-volatile and volatile memory systems. Further, the server(s) (945) can be implemented as one combined server, or as multiple cooperating servers hosted on one or more data processing systems. Using the server(s) (945), client applications can query the advertisement database (947) through an application programming interface.

In one embodiment, to search for one or more advertisements, a client application can specify one or more fields/parameters using the application programming interface, such as category (931), search terms (933), geographic location (935), affiliate identifier (937), filter (939), customer identification (941), etc. A client application can specify values for a subset of the fields/parameters illustrated in FIG. 22. An alternative embodiment may include more or less fields/parameters.

For example, the application programming interface can be an interface for a remote procedure call (RPC) implemented via a web service (e.g., based on Simple Object Access Protocol (SOAP) or the GET method of Hypertext Transfer Protocol (HTTP)). In response to the remote procedure call and the parameters specified according to the interface, the server(s) (945) searches advertisement database (947) and returns a list of one or more advertisements. In one embodiment, the advertisement database (947) is hosted on a database management server, which can be searched using a standard language (e.g., a Structured Query Language (SQL)). For example, the server(s) (945) may query an SQL server to obtain a list of one or more advertisements. In another embodiment, the advertisement database (947) is loaded in the random access memory of one or more of the servers (945), which can perform a search using the data loaded in the random access memory without querying a database management server (e.g., an SQL server). In one embodiment, the advertisement database (947) is loaded into a volatile memory from a non-volatile storage facility (e.g., an SQL server) and synchronized in changes with the non-volatile storage facility.

In one embodiment, the category field (931) can be used to specify a category of products or services that is being requested by a customer. In one embodiment, the request is received from a customer via a demand partner; the category (931) is characterized by the demand partner based on the demand partner's understanding of the need of the customer; and the search terms (933) are the original keywords used by the customer in their request, without being interpreted or mapped by the demand partner.

In one embodiment, the application programming interface allows the client application to specify the geographic location (935) from which the customer is seeking a product or service. The geographic location (935) can be specified as a country, a state, a city, a postal code, coordinates (e.g., latitude and longitude). In one embodiment, when the geographic location is not explicitly specified, the search terms (933) are parsed to look for indication of the target service area; and when no geographic location can be identified from the input fields, the advertisement server may filter out the advertisements for specific local areas in the search.

In one embodiment, an affiliate identifier (937) can be used to track the source of the request. For example, the affiliate identifier (937) can be used to identify a demand partner such that the phone number (957) is assigned accordingly to track the contribution of the demand partner. Alternatively, the source of the request can be identified based on a communication address used to make the remote procedure call.

The affiliate identifier (937) can also be used to track a number of parameters for the demand partner. For example, the demand partner can use the affiliate identifier to associate a number of parameters with the request; and when the customer responds to the advertisement by calling the advertiser, the call can be associated with the affiliate identifier and thus the parameters of the demand partner. For example, the demand partner's parameters can be provided as an encrypted string in the extension part of the affiliate identifier; or the extension part of the affiliate identifier may include a key that can be used by the demand partner to look up the parameters in its database.

In one embodiment, the filter (939) allows the client application to filter outs certain types of advertisements from the search. For example, a filter may be requested to filter out advertisements that advertise adult services or products. For example, a filter may be requested to filter out local advertisers, or national advertisers. For example, a filter may be requested to filter out advertisements from a specific company, or a specific category, or a specific product or service, or a specific advertisement.

In one embodiment, the search is for pitch switching or cross selling; and a filter can be requested to filter out advertisements that are on different economical levels or different quality levels. In one embodiment, when the search is for pitch switching, the advertisement server filters out the advertisements by the same corporation mentioned in the directory assistance request and filters out the advertisements that are not in the same economical and/or quality level of that corporation.

In one embodiment, the request includes an identifier of the requesting client application (e.g., an Internet Protocol (IP) address of the requesting client application, an telephone number of the requester determined via ANI, a hardware serial number of the requester, etc.); and the advertisement server performs security check (e.g., trust and safety verification) using the identifier of the requesting client application (e.g., the IP address, telephone number, hardware serial number).

In one embodiment, the server(s) (945) returns one or more components of the advertisement that is in the resulting list according to the application programming interface. For example, the server(s) (945) may return the business name (951), business address (953), business description (955), phone number (957), web URL (959), price per call, (961), default display (963), audio file URL (965), and/or video file URL (967), etc.

In one embodiment, one or more components of the advertisements are returned in a text format (e.g., in separate fields in an XML format); and thus, the client application can be programmed to present the advertisement in a way independent from the advertisement server. For example, the client application can be programmed to selectively use some of the components to assemble a particular presentation. For example, the client application can selectively convert some of the returned text fields into an audio message (e.g., via a text-to-speech synthesizer). For example, the client application may apply a formatting template (e.g., font, font size, font effect, etc.) to the text components to provide a uniform appearance of advertisements.

In one embodiment, the business name (951) is used to present the name of the advertising party (e.g., seller, adviser, advertiser, service provider); the business address (953) is used to present the street address of the advertiser; the business description (955) provides a few sentences of marketing message for the advertiser, which may include a promotional offer to convince/persuade the customer to call the advertising party.

In one embodiment, the phone number (957) is a phone reference that is assigned by the system to track the customer responses to the advertisement. The phone number (957) can be a telephone number with or without an extension, or a phone reference for the initiation of a VoIP call, such as a session initiation protocol (SIP) uniform resource identifier (URI). In one embodiment, the phone number (957) is associated with a set of parameters in the database, such as the advertiser's phone number, the demand partner, the supply partner, etc. When the phone number is dialed, the call is connected to a connection provider/tracker (e.g., a telephony facility and/or server operated by Ingenio), which can look up the advertiser's phone number using the dialed phone number as a key.

Alternatively or in combination, the phone number (957) can include an encoded/encrypted set of parameters, which can be decoded/decrypted without having to look up the parameters from a database. For example, the parameters can be encoded/encrypted in the extension part of the phone number; or the user identifier portion of the SIP address can contain an encrypted string that can be decrypted into the parameters. Further, for example, one of the parameters decrypted from the string may be used to look up other parameters; or the encrypted phone number can be used as a key to look up other parameters.

In one embodiment, in addition to the tracking of the advertisers who receive the communication leads as a result of the advertisements and the demand partners who are creditable for the opportunity of targeting the advertisement at the customer, the advertisement server can further associate the phone number (957) with parameters such as an identifier of a supply partner who is creditable for bringing in the advertiser, information of the customer who is going to receive the advertisement (e.g., the IP address of the customer, the phone number of the customer, a user ID of the customer), the search terms used by the customer, the categories characterized by the demand partner, the date of the search that results in the delivery of the advertisement, the keywords that cause the advertisement to be selected in the search, the product or service specific to the request, the position of the advertisement in the ordered list of advertisements that are returned as the result of the search, etc. The tracked information can be used to improve the selection of advertisements in response to search requests. The tracked information can be used to correlate queries from demand partners with calls made from customers.

In one embodiment, a click-to-call reference can be used in the place of the telephone number to track the communication leads generated from the advertisements. When the click-to-call reference is used, a customer is presented with a button or icon or link, which when selected causes a message to be sent to a connection provider/tracker. The click-to-call reference identifies advertiser's phone number; and the customer provides the phone number to call back the customer. Thus, by calling both the advertiser and the customer, the connection provider/tracker can make the connection for the customer and track the communication leads delivered to the advertiser.

In one embodiment, a click-to-assign reference can be used in the place of the telephone number. The reference is associated with the advertiser; and a button or icon or link with the click-to assign reference is selected, the reference is transmitted to the server to request for the telephone number that is assigned to the advertiser. This arrangement can postpone the need for a separate telephone number for the tracking of the communication lead until the explicit request from the customer.

In one embodiment, when a communication between a customer and an advertiser is facilitated via the phone number (957), at least a portion of the communication goes through a tracker such that the communication leads generated by the advertisement for the advertiser can be tracked (e.g., to determine the performance of the advertisement and/or to bill the advertiser based on the count of communication leads).

In one embodiment, the web URL (959) is used to point to a web page that can provide further details about the advertiser and/or the advertisement. For example, a web page hosted on the server(s) (945) can be used to provide further details on the advertisement, such as the detailed specifications of the products or services offered, user feedback, etc. In one embodiment, a combined server is used to identify the advertisement and to provide the web page. In another embodiment, separate, distinct servers are used to identify the advertisement and to provide the web page. Alternatively, the web URL (959) may point to a web page that is maintained by the advertiser.

In one embodiment, the advertisement is at least charged for according to a price per call (961) which is specified by the advertiser. The price per call (961) can be used by a demand partner to selectively present or prioritize the returned advertisements.

In one embodiment, the server(s) (945) also provides a default display (963) of the advertisement. The default display (963) may be provided in a plain text format, a rich text format, or an HTML format. In one embodiment, the request received via the application programming interface includes a requested format for the default display; and the advertisement server provides the default display according to the requested format.

In one embodiment, the advertisement may include an audio version or an audio component; and the server(s) (945) provides the audio file URL (965) of the audio version/component to allow the client application to retrieve the audio file separately from the response (e.g., for improved performance). For example, a client application may pre-fetch the audio component or cache the audio component from previous request. If the audio component is already in the cache of the client application, the re-transmission of the audio component to the client application can be eliminated.

In one embodiment, the client application can determine whether is a change to the cached audio component by examining the audio file URL (965). For example, after an audio file for an advertisement is changed, the audio file URL (965) is also changed. Thus, the client application can compare the audio file URL (965) and URL of the cached version of the audio file to determine whether there is a need to re-load the audio file. In one embodiment, the request may include a requested format (e.g., wav, mp3, Ogg Vorbis, AC-3, MPEG-4, RealAudio, etc.) for the audio file; and the server(s) filters the advertisements based on the requested format, or converts the audio files into the requested format for the client application.

In one embodiment, the advertisement may include a video version or a video component; and the server(s) (945) provides the video file URL (965) of the video file to allow the client application to retrieve the video file separately from the response (e.g., for improved performance). In one embodiment, the request may include a requested format (e.g., MPEG, DVIX, H.263, WMV, etc.) for the video file; and the server(s) filters the advertisements based on the requested format, or converts the video files into the requested format for the client application.

In one embodiment, the advertisement may include an image version or an image component (e.g., logo); and the server(s) (945) provides the image file URL to allow the client application to retrieve the image file separately from the response (e.g., for improved performance). In one embodiment, the request may include a requested format (e.g., JPG, GIF, TIF, etc.) for the image file; and the server(s) filters the advertisements based on the requested format, or converts the images into the requested format for the client application.

In one embodiment, the response to the remote procedure call includes an identifier of the advertisement. The identifier can be used to determine whether one or more components of the advertisement is already in the cache of the client application. In one embodiment, the identifier can be used to check for updates to specific components of the advertisement. For example, the client application may use the identifier to check whether an audio/video component is in the cache and remove the older version of the audio/video component when a newer version is available.

In one embodiment, the identifier of the advertisement is specific to the advertisement listing from the point of view of the advertisers; and the identifier of the advertisement is not specific to the parameters to be tracked, such as the demand partner, the keywords used in the search, the date of the search, etc.

In one embodiment, the request received via the application programming interface indicates whether the advertisements are retrieved for caching, or for presentation to a customer. For example, the client application can search for advertisements that are likely to be presented, cache the advertisements, especially large components of the advertisements (e.g., the audio, video, image files), before the opportunity for advertising to a customer arrives. Such an indication allows the advertisement server to count presentations of advertisements precisely, while allowing the caching of the advertisements.

Alternatively, a client application may report the presentation of an advertisement via a separate communication with the advertisement server; and the advertisement server may not count the presentations of advertisements based on the search requests.

Figure 23:
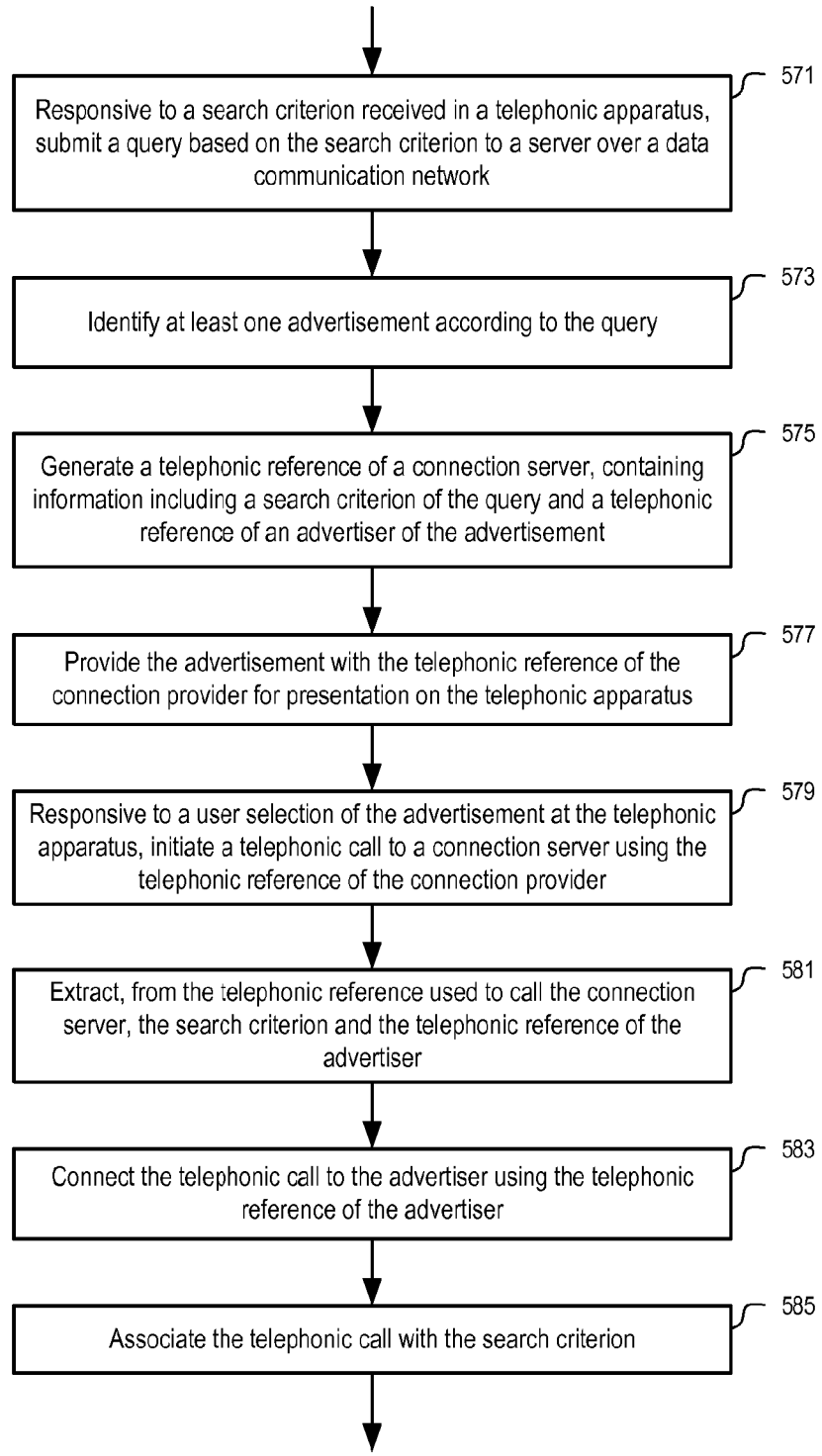
FIG. 23 illustrates a method to connect a telephonic apparatus to an advertiser and to track parameters associated with the telephonic call via a telephonic reference of a connection server that includes the parameters to be tracked according to one embodiment.

FIG. 23 illustrates a method to connect a telephonic apparatus to an advertiser according to one embodiment. In FIG. 23, responsive to a search criterion received in a telephonic apparatus, a query based on the search criterion is submitted (571) over a data communication network to a server (or to a peer to peer network). At least one advertisement is identified (573) according to the query. A telephonic reference of a connection server is generated (575) to contain information including a search criterion of the query and a telephonic reference of an advertiser of the advertisement. The telephonic reference of the connection server may be a session initiation protocol (SIP) uniform resource identifier (URI), a telephone number with an extension, or a Voice over Internet Protocol (VoIP) user identifier. In one embodiment, the telephonic reference is provided in a form according to a calling capability of the telephonic apparatus indicated in the query.

In one embodiment, the telephonic reference of the connection server is encrypted with information about the query, such as the search criterion, an identification of the advertisement, a timestamp of the query, an entity of the telephonic apparatus, an identification of a user of the telephonic apparatus, a position of the advertisement in a result of a search performed in response to the query, a price of an advertisement fee offered by the advertiser, etc.

In one embodiment, the telephonic reference of the connection server is further encrypted information such as an identification of a distributor of the telephonic apparatus, an identification of a distribution channel of the advertisement, or an identifier of a party who has a contribution in a process of delivering the advertisement to the telephonic apparatus.

In FIG. 23, the advertisement is provided (577) with the telephonic reference of the connection provider for presentation on the telephonic apparatus. Responsive to a user selection of the advertisement at the telephonic apparatus, a telephonic call is initiated (579) to a connection server using the telephonic reference of the connection provider. In one embodiment, the telephonic reference of the connection server is transmitted to the connection server via a data communication network in a process of the telephonic apparatus initiating the telephonic call to the connection server. In one embodiment, the telephonic apparatus initiates the telephonic call via a gateway between the telephonic apparatus and the connection server; the telephonic apparatus communicates with the gateway in a first protocol; and the gateway communicates with the connection server in a second protocol. In one embodiment, the gateway is selected from a plurality of gateways based on a distance on Internet between the gateways and the connection server.

In FIG. 23, the search criterion and the telephonic reference of the advertiser are extracted (581) from the telephonic reference used to call the connection server. The telephonic call is then connected (583) to the advertiser using the telephonic reference of the advertiser. The telephonic call is then associated (585) with the search criterion.

In one embodiment, in response to the query, an encrypted string is generated as part of the telephonic reference to include information about the query and a telephonic reference of the advertiser.

In one embodiment, the encrypted string includes an identification of the telephonic apparatus from which the query is received; and the connection server is to determined, using the encrypted string, whether an identification of the telephonic apparatus which initiates the telephonic call to the connection server matches with the identification of the telephonic apparatus from which the query is received.

In one embodiment, the encrypted string includes an identification of a user of the telephonic apparatus from which the query is received; and the connection server is to determine, using the encrypted string, whether an identification of a user of the telephonic apparatus which initiates the telephonic call to the connection server matches with the identification of the user of the telephonic apparatus from which the query is received.

In one embodiment, the server retrieves the advertisement via a web service in response to the query and provides the advertisement to the telephonic apparatus. In one embodiment, the server further retrieves a listing from a listing database maintained by the server and provides the listing with the advertisement to the telephonic apparatus. In one embodiment, the advertisement and the listing are selectively provided based on data representing a social network maintained by the server.

In one embodiment, a geographic location of the telephonic apparatus is determined and submitted with the query. The advertisement is selected based at least in part on the geographic location. The geographic location can be determined based on a user preference stored in the telephonic apparatus, a server, or a peer to peer network, a user input specified with the search criterion, an Internet address associated with the telephonic apparatus, a GPS receiver coupled with the telephonic apparatus, or via an access point of a wireless communication system or a cellular position determination system.

Figure 24:
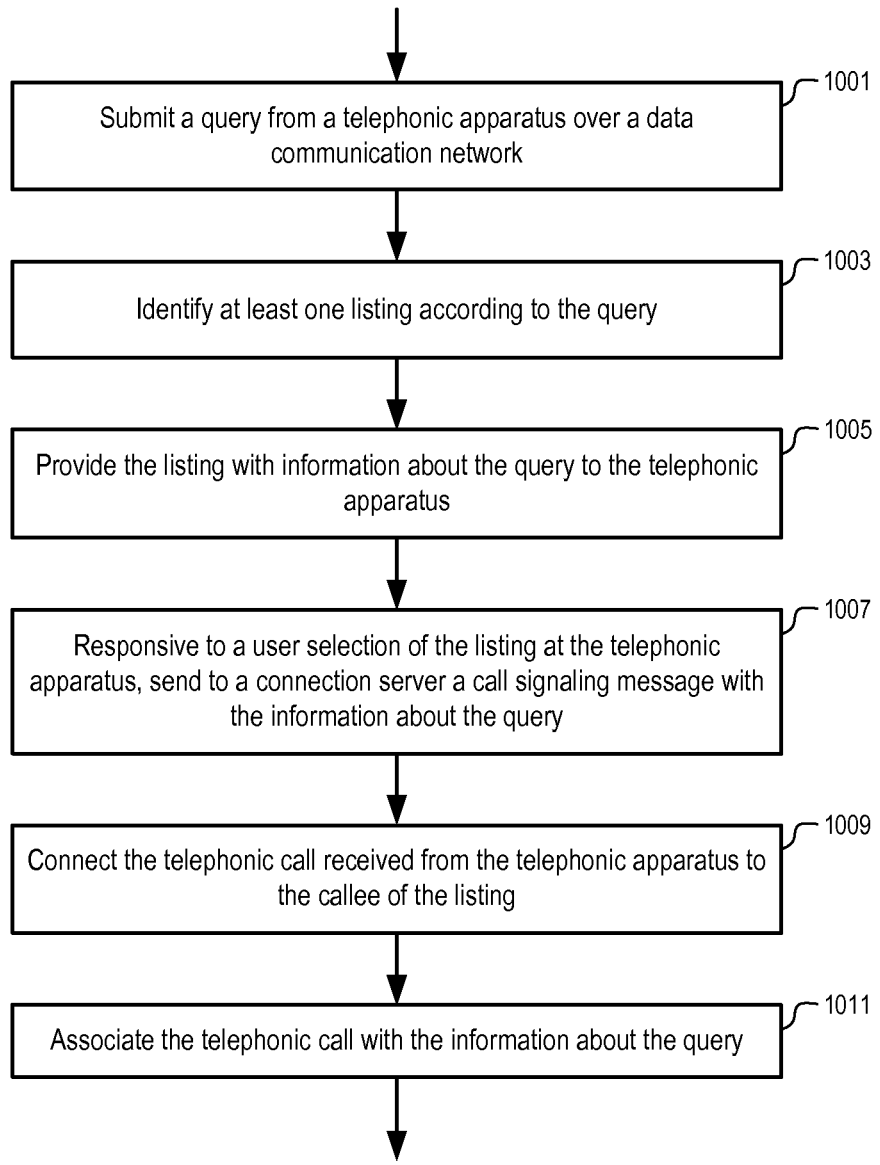
FIG. 24 illustrates a method to track parameters associated with a call via a call signaling message to a connection server that contains the parameters to be tracked according to one embodiment.

FIG. 24 illustrates a method to track parameters associated with a call via a call signaling message to a connection server that contains the parameters to be tracked according to one embodiment. In FIG. 24, in response to a query submitted (1001) from a telephonic apparatus over a data communication network, at least one listing is identified (1003) according to the query. The listing is provided (1005) with information about the query to the telephonic apparatus. Responsive to a user selection of the listing at the telephonic apparatus, a call signaling message is sent (1007) with the information about the query from the telephonic apparatus to a connection server. The connection server connects (1009) the telephonic call from the telephonic apparatus to the callee of the listing and associates (1010) the telephonic call with the information about the query.

Figure 25:
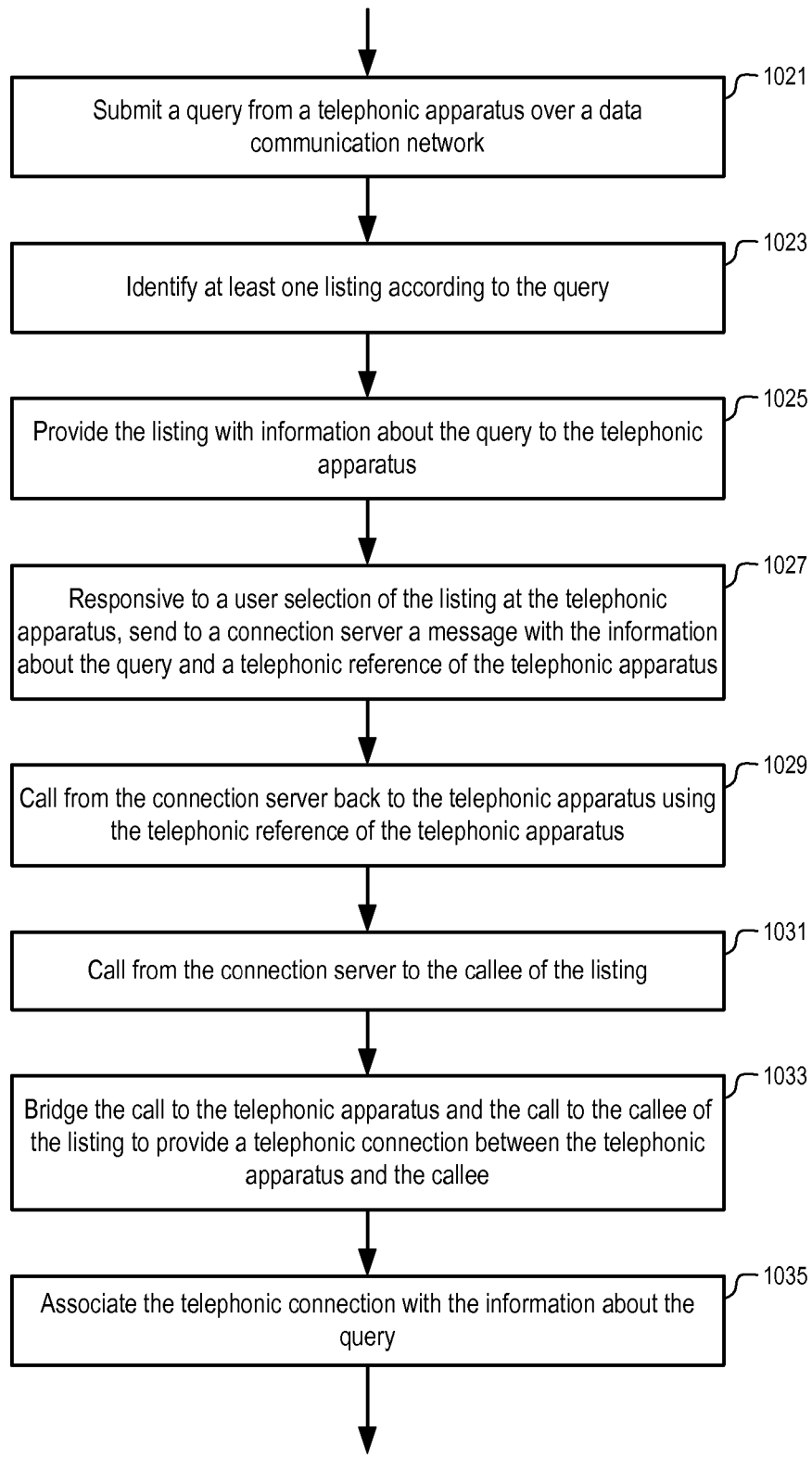
FIG. 25 illustrates a method to track parameters associated with a call via a report message from the telephonic apparatus that associates the call with the parameters to be tracked according to one embodiment.

FIG. 25 illustrates a method to track parameters associated with a call via a report message from the telephonic apparatus that associates the call with the parameters to be tracked according to one embodiment. In FIG. 25, in response to a query submitted (1021) from a telephonic apparatus over a data communication network, at least one listing is identified (1023) according to the query and provided (1025) with information about the query to the telephonic apparatus. Responsive to a user selection of the listing at the telephonic apparatus, a message with the information about the query and a telephonic reference of the telephonic apparatus is sent from the telephonic apparatus to a connection server to request a callback to the telephonic apparatus. In response to the message, the connection server (1029) calls back the telephonic apparatus using the telephonic reference of the telephonic apparatus provided in the message, calls (1031) the callee of the listing, bridges (1033) the call to the telephonic apparatus and the call to the callee of the listing to provide a telephonic connection between the telephonic apparatus and the callee, and associates (1035) the telephonic connection with the information about the query.

Figure 26:
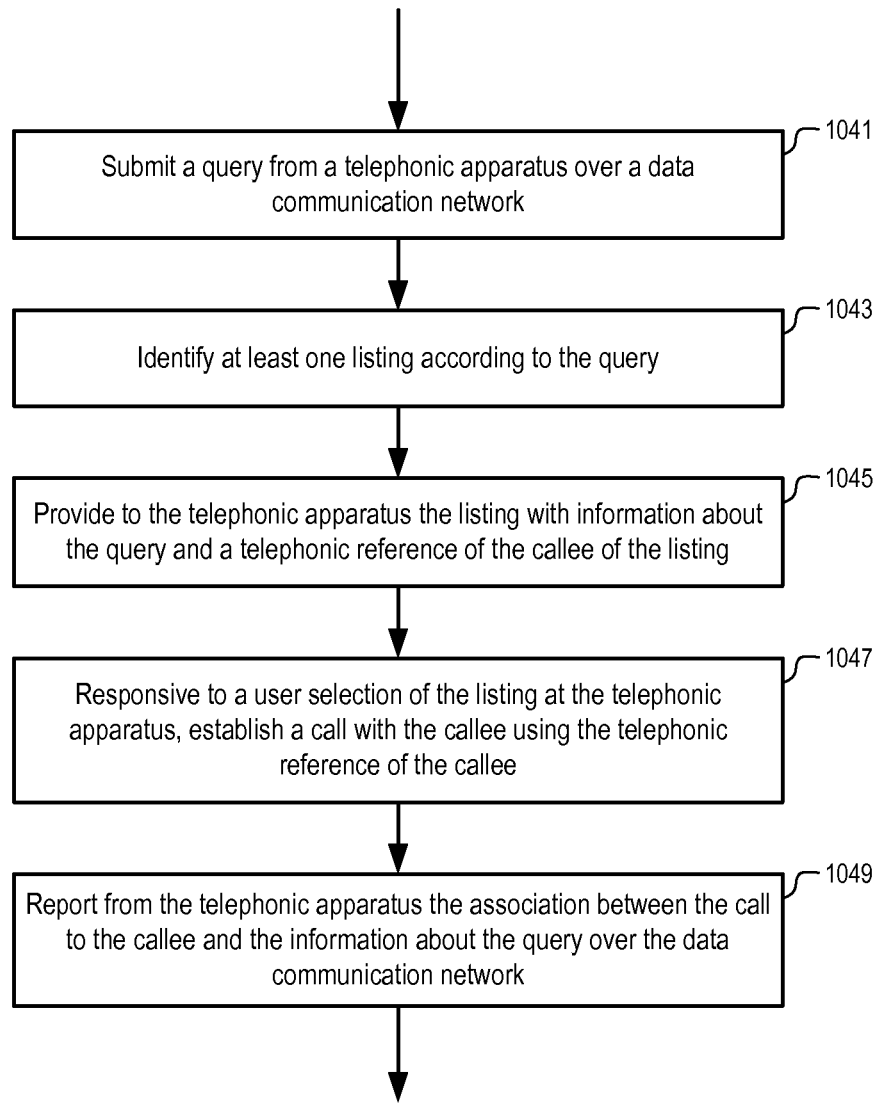
FIG. 26 illustrates a method to track parameters associated with a call via a request message that contains the parameters to be tracked to resolve a telephonic reference of the callee according to one embodiment.

FIG. 26 illustrates a method to track parameters associated with a call via a request message that contains the parameters to be tracked to resolve a telephonic reference of the callee according to one embodiment. In FIG. 26, in response to a query submitted (1041) from a telephonic apparatus over a data communication network, at least one listing is identified (1043) according to the query and provided (1045) to the telephonic apparatus together with information about the query and a telephonic reference of the callee of the listing. Responsive to a user selection of the listing at the telephonic apparatus, a call is established (1047) with the callee using the telephonic reference of the callee. The telephonic apparatus reports (1049) the association between the call to the callee and the information about the query over the data communication network.

Figure 27:
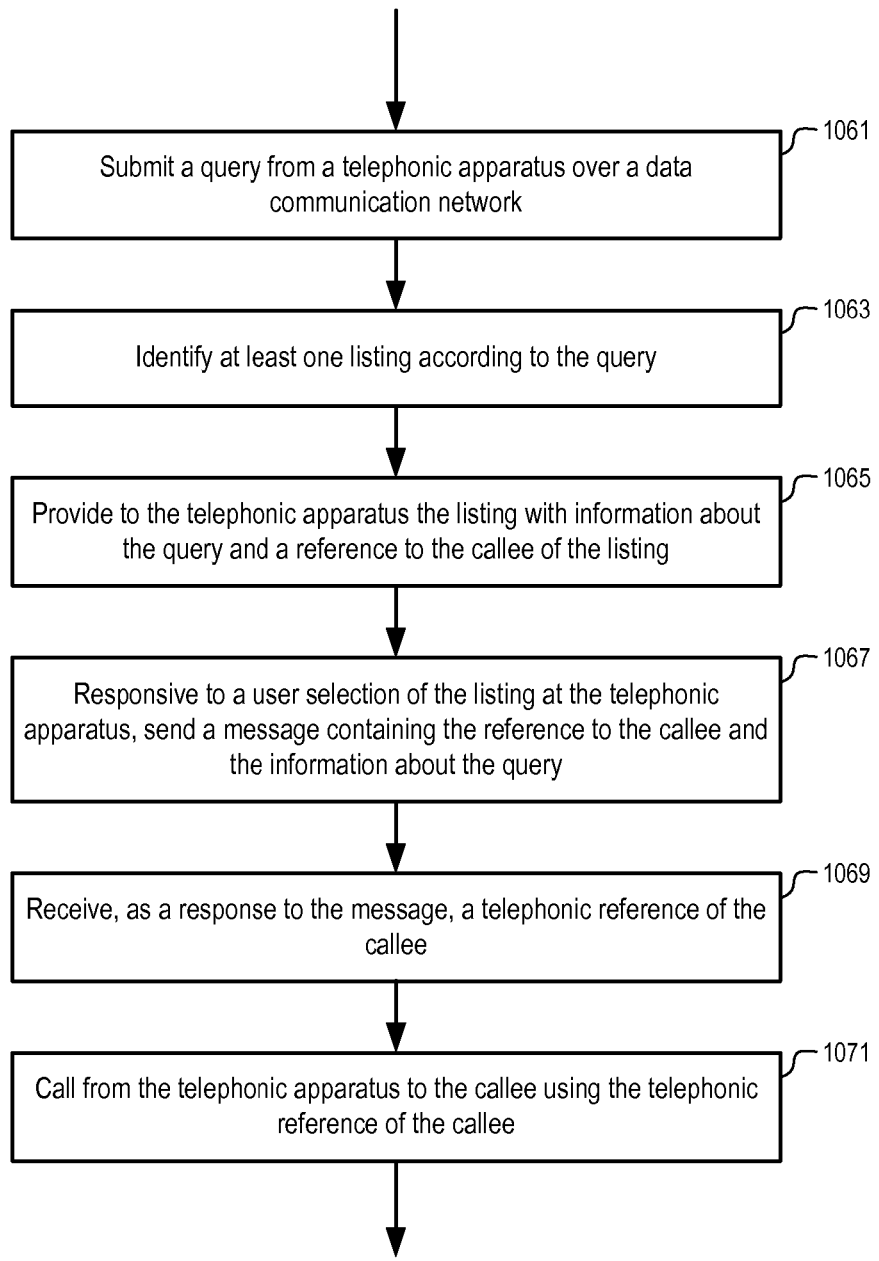
FIG. 27 illustrates a method to track parameters associated with a call via a callback message that contains the parameters to be tracked according to one embodiment.

FIG. 27 illustrates a method to track parameters associated with a call via a callback message that contains the parameters to be tracked according to one embodiment. In FIG. 27, in response to a query submitted (1061) from a telephonic apparatus over a data communication network, at least one listing is identified (1063) according to the query and provided (1065) to the telephonic apparatus together with information about the query and a reference to the callee of the listing. Responsive to a user selection of the listing at the telephonic apparatus, a message containing the reference to the callee and the information about the query is sent to receive (1069), as a response to the message, a telephonic reference of the callee. Using the telephonic reference of the callee, the telephonic apparatus calls (1071) the callee.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMs), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A method, comprising:
   receiving, via a data communication network, a search query from a telephonic apparatus, the search query comprising search criterion;
   identifying an advertisement based on the query;
   generating a telephonic reference of a connection provider comprising the search criterion, a telephonic reference of an advertiser of the advertisement, an identification of the advertisement, a timestamp of the query, an identity of the telephonic apparatus, an identification of a user of the telephonic apparatus, a position of the advertisement in a result of a search performed in response to the query, and a price of an advertisement fee offered by the advertiser, wherein the telephonic reference of the connection provider further comprises one of a session initiation protocol uniform resource identifier, a telephone number without an extension, a telephone number with an extension, and a voice over internet protocol user identifier, and wherein the telephonic reference of the connection provider is encrypted;
providing, via the data communication network, the advertisement with the telephonic reference of the connection provider to the telephonic apparatus;
responsive to a user selection of the advertisement at the telephonic apparatus, initiating a telephonic call to the connection provider using the telephonic reference of the connection provider;
extracting the search criterion and the telephonic reference of the advertiser from the telephonic reference of the connection provider;
connecting a telephonic call to the advertiser using the telephonic reference of the advertiser; and
associating the telephonic call to the advertiser with the search criterion.

2. The method of claim 1, wherein the telephonic reference is provided in a form according to a calling capability of the telephonic apparatus.

3. The method of claim 1, wherein the telephonic reference of the connection provider additionally comprises an identification of a distributor of the telephonic apparatus, an identification of a distribution channel of the advertisement, and an identifier of a party who has a contribution in a process of delivering the advertisement to the telephonic apparatus.

4. The method of claim 1, further comprising:
retrieving, via a listing server, in response to the query the advertisement and providing the advertisement to the telephonic apparatus.

5. The method of claim 4, further comprising:
retrieving, via the listing server, in response to the query a listing from a listing database maintained by the listing server and providing the listing with the advertisement to the telephonic apparatus.

6. The method of claim 5, wherein the advertisement and the listing are selectively provided based on data representing a social network maintained by the listing server.

7. The method of claim 1, further comprising:
determining a geographic location of the telephonic apparatus;
wherein the query includes the geographic location of the telephonic apparatus; and
wherein the advertisement is selected based at least in part on the geographic location.

8. The method of claim 7, wherein the geographic location is determined based on one of a user preference, a user input specified with the search criterion, and an Internet address associated with the telephonic apparatus.

9. The method of claim 8, wherein the user preference is stored in a peer to peer network.

10. The method of claim 1, wherein the telephonic reference of the connection provider additionally comprises an identification of a user of the telephonic apparatus from which the query is received; and the connection provider determines using the telephonic reference of the connection provider, whether an identification of a user of the telephonic apparatus which initiates the telephonic call to the connection server matches with the identification of the user of the telephonic apparatus from which the query is received.

11. A non-transitory machine readable media storing instructions, the instructions, when executed by a computing device, causing the computing device to perform a method, the method comprising:
receiving a search query from a telephonic apparatus, the search query comprising search criterion;
identifying an advertisement based on the query;
generating a telephonic reference of a connection provider comprising the search criterion, a telephonic reference of an advertiser of the advertisement, an identification of the advertisement, a timestamp of the query, an identity of the telephonic apparatus, an identification of a user of the telephonic apparatus, a position of the advertisement in a result of a search performed in response to the query, and a price of an advertisement fee offered by the advertiser, wherein the telephonic reference of the connection provider further comprises one of a session initiation protocol uniform resource identifier, a telephone number without an extension, a telephone number with an extension, and a voice over internet protocol user identifier, and wherein the telephonic reference of the connection provider is encrypted;
providing the advertisement with the telephonic reference of the connection provider to the telephonic apparatus;
responsive to a user selection of the advertisement at the telephonic apparatus, initiating a telephonic call to the connection provider using the telephonic reference of the connection provider;
extracting the search criterion and the telephonic reference of the advertiser from the telephonic reference of the connection provider;
connecting a telephonic call to the advertiser using the telephonic reference of the advertiser; and
associating the telephonic call to the advertiser with the search criterion.

12. A system, comprising:
a data communication network configured to:
receive a search query from a telephonic apparatus;
identify an advertisement based on the query;
generate a telephonic reference of a connection provider comprising the search criterion, a telephonic reference of an advertiser of the advertisement, an identification of the advertisement, a timestamp of the query, an identity of the telephonic apparatus, an identification of a user of the telephonic apparatus, a position of the advertisement in a result of a search performed in response to the query, and a price of an advertisement fee offered by the advertiser, wherein the telephonic reference of the connection provider further comprises one of a session initiation protocol uniform resource identifier, a telephone number without an extension, a telephone number with an extension, and a voice over internet protocol user identifier, and wherein the telephonic reference of the connection provider is encrypted;
provide the advertisement with the telephonic reference of the connection provider to the telephonic apparatus;
responsive to a user selection of the advertisement at the telephonic apparatus, initiate a telephonic call to the connection provider using the telephonic reference of the connection provider;
extract the search criterion and the telephonic reference of the advertiser from the telephonic reference of the connection provider;
connect a telephonic call to the advertiser using the telephonic reference of the advertiser; and
associate the telephonic call to the advertiser with the search criterion.

* * * * *